(12) United States Patent
Jacobsen et al.

(10) Patent No.: US 11,406,219 B2
(45) Date of Patent: Aug. 9, 2022

(54) APPARATUS, SYSTEM, AND METHOD FOR BEVERAGE DISPENSING

(71) Applicant: Red River Tea Company, Dallas, TX (US)

(72) Inventors: Jody Jacobsen, Dallas, TX (US); Greg McMullen, Dallas, TX (US); Rick Scheer, Dallas, TX (US); Jeff Farris, Dallas, TX (US)

(73) Assignee: Red River Tea Company, Dallas, TX (US)

( * ) Notice: Subject to any disclaimer, the term of this patent is extended or adjusted under 35 U.S.C. 154(b) by 497 days.

(21) Appl. No.: 16/594,920

(22) Filed: Oct. 7, 2019

(65) Prior Publication Data

US 2020/0109042 A1    Apr. 9, 2020

Related U.S. Application Data

(60) Provisional application No. 62/742,424, filed on Oct. 7, 2018.

(51) Int. Cl.
*B67D 3/00* (2006.01)
*A47J 31/46* (2006.01)
(Continued)

(52) U.S. Cl.
CPC .......... *A47J 31/467* (2013.01); *A47J 31/468* (2018.08); *A47J 31/521* (2018.08); *B67D 1/0021* (2013.01); *B67D 1/0888* (2013.01); *B67D 3/0012* (2013.01); *B67D 3/0022* (2013.01); *B67D 3/0067* (2013.01)

(58) Field of Classification Search
CPC .. B67D 3/0067; B67D 3/0012; B67D 3/0022; B67D 1/0021; B67D 1/0888; A47J 31/468; A47J 31/521; A47J 31/467
See application file for complete search history.

(56) References Cited

U.S. PATENT DOCUMENTS 6,182,555 B1   2/2001  Scheer et al.
8,103,378 B2   1/2012  Crisp, III
(Continued)

FOREIGN PATENT DOCUMENTS

WO    2015161104 A1   10/2015

*Primary Examiner* — Frederick C Nicolas
(74) *Attorney, Agent, or Firm* — Vincent J. Allen; Carstens & Cahoon, LLP

(57) ABSTRACT

An apparatus, system, and method for beverage dispensing, and control and management of a beverage dispenser. The beverage dispenser can have an enclosure. The enclosure includes a base section, a control section, and a dispensing section. The base section can be configured to house one or more BIBs, and support one or more beverage containers. The control section can be configured to house a heating device, one or more pumps, control circuits, communication circuits, distribution circuits, and fluid management systems. The dispensing section can be configured to house a computing device, one or more fluid dispensers, and support a brewing or mixing container. The brewing or mixing container can allow for the brewing, mixing, or blending of a beverage that can be dispensed to one or more beverage containers. The beverage dispenser can communicate through a computer network to a management, maintenance, and support portal.

20 Claims, 18 Drawing Sheets

(51) Int. Cl.
*A47J 31/52* (2006.01)
*B67D 1/00* (2006.01)
*B67D 1/08* (2006.01)

(56) References Cited

U.S. PATENT DOCUMENTS

| | | | |
|---|---|---|---|
| 9,591,945 B2 | 3/2017 | Farris | |
| 10,342,378 B2 * | 7/2019 | Farris | A23L 2/54 |
| 2004/0118291 A1 * | 6/2004 | Carhuff | A61L 2/04 |
| | | | 99/275 |
| 2012/0234183 A1 * | 9/2012 | Edwards | A47J 31/46 |
| | | | 99/291 |
| 2015/0296855 A1 | 10/2015 | Farris | |
| 2016/0059191 A1 * | 3/2016 | Bandixen | B01F 23/232 |
| | | | 261/76 |
| 2016/0220060 A1 * | 8/2016 | Clark | A47J 31/467 |
| 2021/0212501 A1 * | 7/2021 | Farris | A47J 31/467 |

* cited by examiner

CUSTOMER BREAKDOWN - TOTALED BY STORE
09/01/2018 - 09/30/2018

| CUSTOMER | STORE | MACHINE | RECIPE | PRODUCT | # OF BREWS | CASED CONSUMED | WATER USED (OZ) | SWEETENER USED (OZ) | # OF 5 GAL BIB'S |
|---|---|---|---|---|---|---|---|---|---|
| | CHEV DOWNTOWN CP1-2 | SB-123456 | RECP-1001 | BLACK TEA 48/2 | 78 | 1.63 | 19,968 | 0 | - |
| | | | RECP-1002 | BLACK TEA 48/2 SWEET | 56 | 1.17 | 14,336 | 1,988 | 3.11 |
| | | SB-987654 | RECP-1001 | BLACK TEA 48/2 | 81 | 1.69 | 20,736 | 0 | - |
| | | | RECP-1002 | BLACK TEA 48/2 SWEET | 62 | 1.29 | 15,872 | 2,201 | 3.44 |
| | | | RECP-1003 | GREEN TEA 48/2 | 28 | 0.58 | 7,168 | 0 | - |
| | | | SUB TOTALS | | 305 | 6.36 | 77,810 | 4189 | 6.55 |
| SULLY'S PETROLEUM | CHEV SULLY'S COFFEE | SB-987654 | RECP-1001 | BLACK TEA 48/2 | 81 | 1.69 | 20,736 | 0 | - |
| | | | RECP-1002 | BLACK TEA 48/2 SWEET | 62 | 1.29 | 15,872 | 2,201 | 3.44 |
| | | | RECP-1003 | GREEN TEA 48/2 | 28 | 0.58 | 7,168 | 0 | - |
| | | | RECP-1004 | MANGO 48/2 SWEET | 35 | 0.73 | 8,960 | 1,243 | 1.94 |
| | | | SUB TOTALS | | 206 | 4.29 | 52,736 | 3,444 | 5.38 |
| | SULLY'S OLIVE DRIVE | SB-010120 | RECP-1001 | BLACK TEA 48/2 | 64 | 1.33 | 16,384 | 0 | - |
| | | | RECP-1003 | GREEN TEA 48/2 | 42 | 0.88 | 10,752 | 0 | - |
| | | | RECP-1004 | MANGO 48/2 SWEET | 52 | 1.08 | 13,312 | 1,846 | 2.88 |
| | | | SUB TOTALS | | 158 | 3.29 | 40,448 | 1,846 | 2.88 |
| | CUSTOMER TOTALS | | | | 669 | 13.94 | 170,994 | 9479 | 14.81 |
| JOE'S STOP-N-GO | MAIN ST BRADY | SB-239001 | RECP-1001 | BLACK TEA 48/2 | 42 | 0.88 | 10,752 | 0 | - |
| | | | RECP-1002 | BLACK TEA 48/2 SWEET | 33 | 0.69 | 8,448 | 1,172 | 1.83 |
| | | | RECP-1004 | MANGO 48/2 SWEET | 56 | 1.17 | 14,336 | 1,988 | 3.11 |
| | | | SUB TOTALS | | 131 | 2.73 | 33,536 | 3,160 | 4.94 |
| | CUSTOMER TOTALS | | | | 131 | 2.73 | 33,536 | 3,160 | 4.94 |
| GRAND TOTALS | | | | | 800 | 16.67 | 204,530 | 12,639 | 19.75 |

FIG. 14

APPARATUS, SYSTEM, AND METHOD FOR BEVERAGE DISPENSING

CROSS-REFERENCE TO RELATED APPLICATIONS

This application is a Non-Provisional Application claiming priority to U.S. Provisional Patent Application No. 62/742,424 filed Oct. 7, 2018, which is incorporated herein by reference in its entirety.

BACKGROUND

Technical Field

The present disclosure relates to beverage dispensers. More particularly, and not by way of limitation, the present disclosure is directed to an apparatus, system and method for dispensing a brewed or mixed beverage from an enclosed dispenser.

Description of Related Art

In the beverage dispensing industry there are several problems that are encountered on a daily basis. First, if there is any mixing or adding of sweeteners, flavors, or substances added to a beverage from a Bag In a Box (BIB), the BIB is usually many feet, or yards from the dispenser requiring the use of an external pump and compression system to keep the BIB fluid moving from the BIB to the dispenser. Second, the BIB fluids often requires a specific temperature to be maintained to provide the necessary viscosity of the various sweeteners, flavors, or other substances for use with the dispenser. Thus, with a long run of hoses or lines between the storage area for the BIBs and the dispenser(s) the temperature and pressure variations can cause issues that prevent a mixing in accordance with a desired recipe for various beverages that can be dispensed. Additionally, a system that can brew and/or mix multiple recipes of various beverages is difficult, as each recipe may require individual flavors, sweeteners, syrups, and/or brewing materials, and often cannot be combined with multiple beverage storage containers or urns for dispersion and use by a consumer.

It would be advantageous to have an apparatus, system and method for beverage dispensing that overcomes the disadvantages of the prior art. The present disclosure provides such an apparatus, system and method.

BRIEF SUMMARY

The present disclosure is directed to a beverage dispensing apparatus including an enclosure, the enclosure further comprising a base section capable of enclosing at least one bag in a box (BIB), a control section capable of housing a heating device, at least one pump, at least one circuit, and at least one fluid input, and a dispensing section having at least one fluid dispenser, and a computing device. The beverage dispensing apparatus can also have a brewing container, wherein the brewing container is supported by a support structure along the bottom of the dispensing section. The brewing container can have a mixing section and a brewing section that includes a brewing reservoir and a brewing filter. The beverage dispensing apparatus can include at least one beverage container having a brewing container reservoir defined by the beverage container for receiving a beverage from the brewing container, a beverage container cover, and a dispensing nozzle.

Thus, in one aspect, the present disclosure is directed to a beverage dispensing apparatus including a base section capable of housing at least one bag in a box (BIB) within an enclosure defined by the base section, wherein the base is capable of supporting at least one beverage container. The beverage container can have a beverage container reservoir and a beverage container cover. The beverage dispensing apparatus can also have a control section within an enclosure supported and connected to and above the base, wherein the control section enclosure houses a heating device, at least one pump, at least one circuit, and at least one fluid input. The beverage dispensing apparatus can include a dispensing section with an enclosure defined by the dispensing section, supported and connected to and above the control section, wherein the dispensing section enclosure houses at least one fluid dispenser, a computing device, and a support structure for the brewing container, wherein the computing device includes at least one camera, at least one touchscreen display, and at least one power input.

In another aspect, the present disclosure is directed to a system for dispensing a beverage including a base enclosure capable of housing at least one bag in a box (BIB) and supporting at least one beverage container along the top of the base enclosure. The system can also have a control enclosure coupled to the base enclosure for housing at least one control circuit, at least one communication circuit, a heating device, at least one pump, at least one fluid input, and at least one solenoid. The system can include a dispensing enclosure having at least one fluid dispenser configured to dispense a first fluid to the brewing container, a computing device with a display, and a support structure for a brewing container. The brewing container can be configured to receive the first fluid and blend it with a second fluid to generate the beverage and provide the beverage to the at least one beverage container.

In yet another aspect, the present disclosure is directed to a system for controlling a beverage dispensing device including a control circuit electrically coupled to a pump, at least one solenoid, and a heating device. The system can also have a communication circuit electrically coupled to the control circuit, and configured to communicate with a computing device and the communications including a control dataset. The computing device can be configured to communicate with a computer network, the computer network coupled to at least one server, and at least one database; and the computing device can be configured to control the beverage dispensing device through the control circuit for preparing a beverage.

In another aspect, the present disclosure is directed to a method for controlling a beverage dispensing device by providing a control signal to a control circuit having at least one input and at least one output, the control signal being transmitted from a computing device via a communication circuit. The method also pumps a mixing fluid to a first dispensing nozzle via a mixing pump electrically coupled to the control circuit. The method additionally controls a solenoid for a controlled fluid that can be provided to a heating device or the first dispensing nozzle. The method can include heating the controlled fluid with the heating device that is electrically coupled to the control circuit. The method can also generate a heated fluid from a second dispensing nozzle. The method can include dispensing one or both the heated fluid and mixing fluid to a brewing container, the mixing fluid dispensing to a mixing section of the brewing container, and the heated fluid to a brewing reservoir of the brewing container. The method can include blending the mixing fluid and heating fluid together and providing the blend fluid as a beverage to a beverage container.

In yet another aspect, the present disclosure is directed to a method for managing one or more beverage dispensers by storing a configuration dataset in a database wherein the configuration dataset includes a global dataset, a customer database, a store database, and a machine database. The method can also include communicating the configuration dataset over a network to a computing device housed within the one or more beverage dispensers. The method can include utilizing the computing device for comparing the configuration dataset to a second configuration dataset to determine if there are any modifications of the second configuration dataset stored on the computing device. The method can include generating a report dataset with the computing device. The method can include sending the generated report dataset over the network to the database and/or preparing analytical data from the report dataset stored in the database.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

FIG. 14 is an illustration of a sample report that may be generated by beverage dispensing system, data management, logs and/or data analytics.

Figure 1:
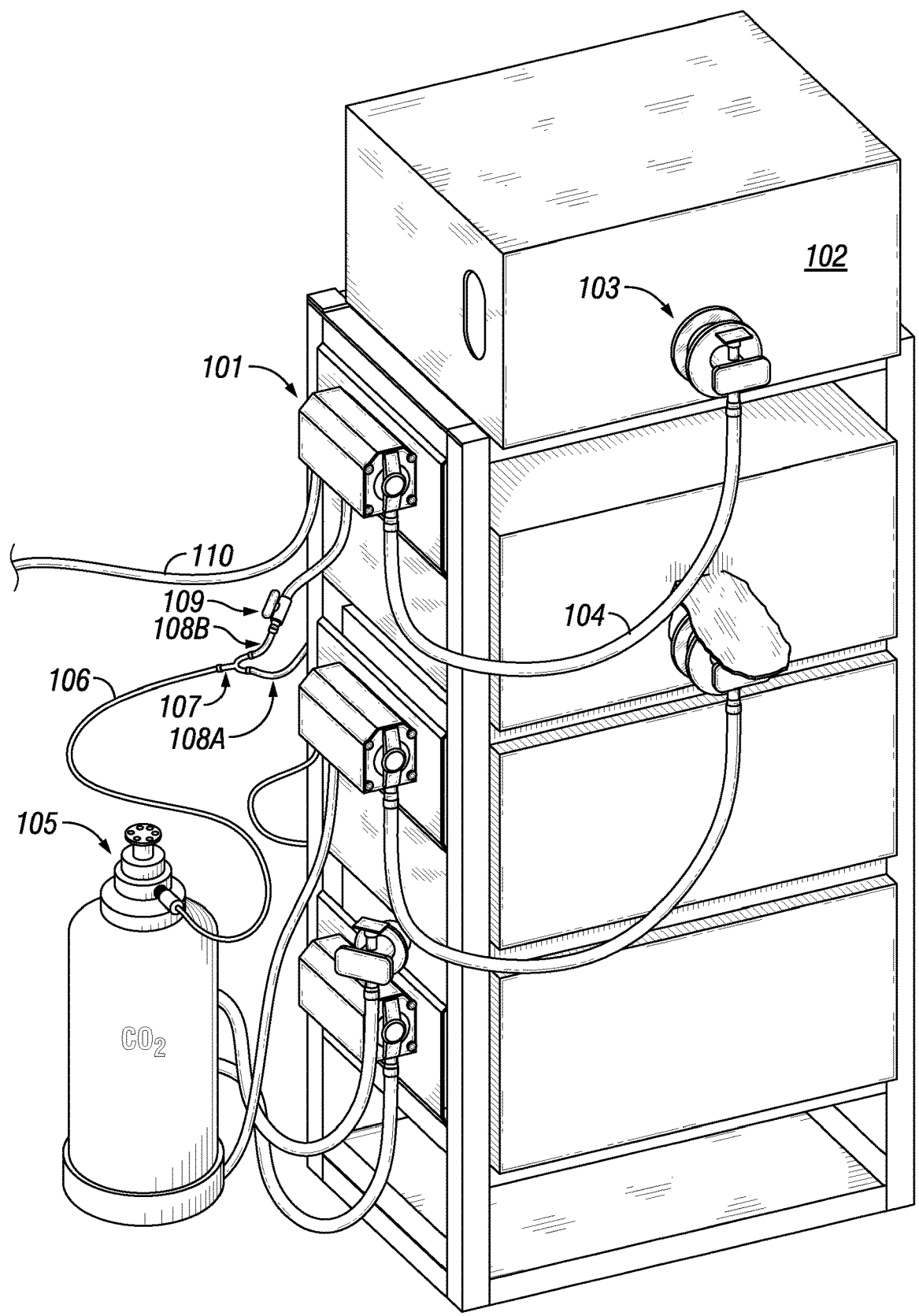
FIG. 1 is a perspective view of the backside of a prior art beverage dispensing system.

The above figures are provided for the purpose of illustration and description only, and are not intended to define the limits of the disclosed invention. When the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment.

DETAILED DESCRIPTION

FIG. 1 is a perspective view of the backside of a prior art beverage dispensing system. Prior art beverage distribution systems require a pump 101 to allow for a bag in a box (BIB) 102 to be utilized to provide various types of syrups, flavors, sweeteners, or other fluids or substances to a beverage or beverage dispensing device. For example, most soda machines require a BIB 102 and pump system that includes the syrup for a soda and/or sweeteners that are added to a pre- or post-mixed beverage along with flavors or other fluids or substances to modify or change a flavoring that can be added or mixed with the beverages. The BIB(s) 102 require long hoses or runs to the beverage dispensing system because the BIBs 102 are typically stored on a shelf or other storage system in the back of the store, restaurant, or other locations throughout the business where they are being distributed from rather than near the machine as shown. The BIB(s) 102 can also be connected to the pump through a connecter 103 and a hose 104. The connector 103 can be a quick access connector or it may also be another form of a connector in some cases, an individual connector or a multiple point connector. From the connector 103, a hose 104 typically runs from the BIB 102 to the pump 101. The pump 101 can utilize compressed air or some other compression system 105. The compressed air tank 105 can also be connected via pressurized hose 106 to a regulator 109. In some cases, the pressurized hose 106 may also be split by a splitter 107 into various lines or hose for distribution. For example, line one 108A or line two 108B can run to a single pump or multiple pumps in a system. In another example, one system may have six to eight BIB(s) 102, and up to eight pumps as a single pump may be required for each BIB.

The pump 101 can take the line from the BIB 102; for example, the hose 104, the compressed air line, illustrated here, through the line one 108B and regulator 109 and then can be output from the pump 101 via a machine run 110. The syrup, flavoring, or other substances can be pressurized via the pump 101, and/or compression system 105 to travel the length or distance of the machine run 110. This machine run 110 can also be several feet and/or yards depending on where and how the restaurant, convenience store, or facility where the beverage dispensing device is configured. For example, a convenience store may have several beverage dispensing systems throughout a store or a single beverage distribution system that may be on the opposite end of the building from where the BIB(s) 102 and the pumping systems are located or stored. As in most cases, businesses do not want the BIBS of syrups and/or sweeteners and other forms of flavors and substances to be accessed by customers. These long runs such as a machine run 110 because of length generate temperature and pressure fluctuations can cause issues with the viscosity of the syrups, flavors, sweeteners and other substances that reach the beverage dispenser.

These fluctuations in temperature and pressure that can cause issues with the beverages being mixed according to the recipes and can result in the beverages coming out more sweet or flavorful than desired or could also be so weak that the flavor or syrup is not even noticeable.

Figure 2A:
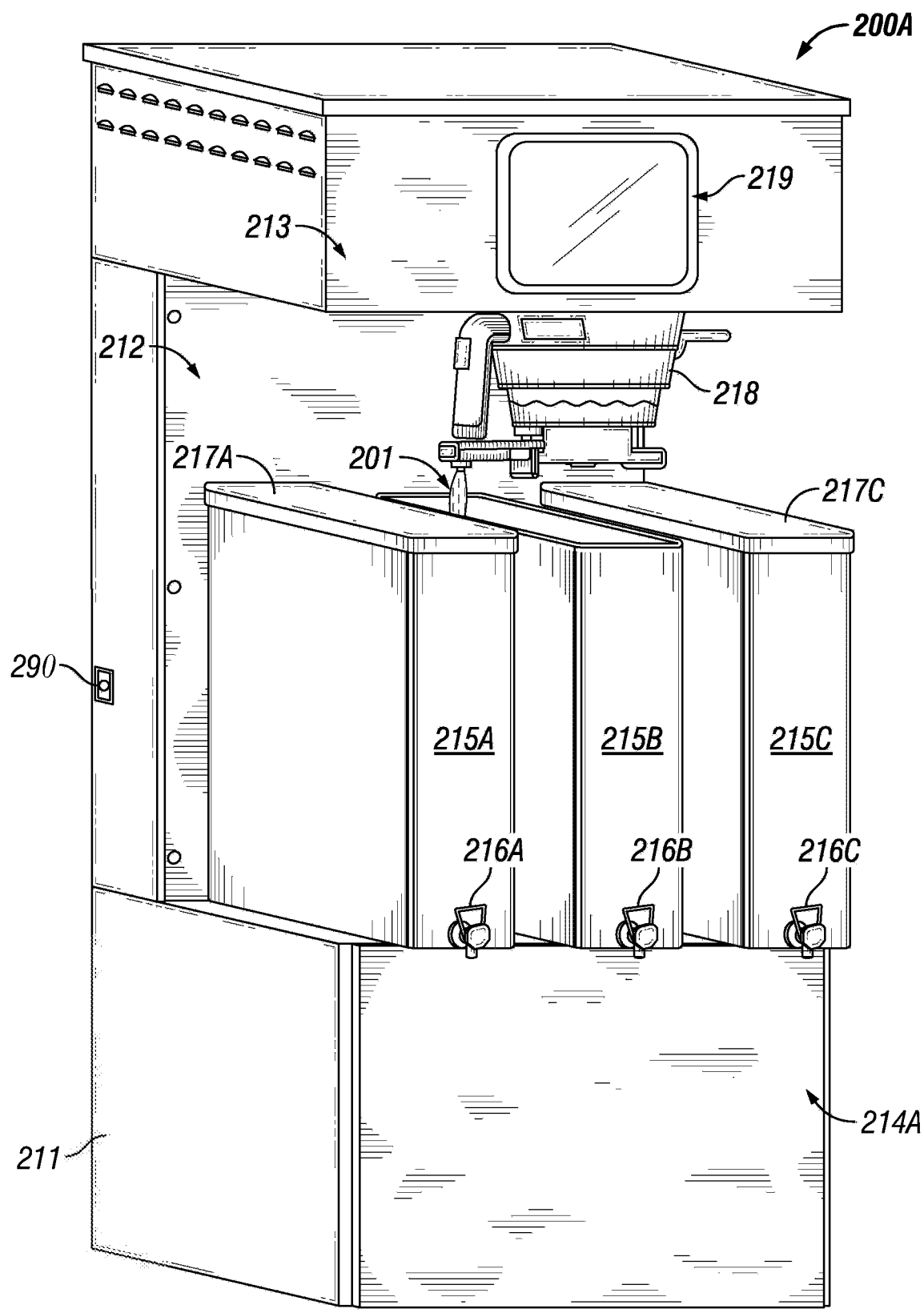
FIG. 2A is a front perspective view of a beverage dispenser.

FIG. 2A is front perspective view of a beverage dispenser 200A in accordance with an embodiment of the present disclosure. The beverage dispenser 200A can include an enclosure 211 and in at least one embodiment can have multiple sections that form the enclosure 211. The enclosure 211 can have a base section 214A, a control section 212, and a dispensing section 213. The base section 214A can include as part of its enclosure section a space to incorporate at least one bag in box (BIB) (not illustrated). The control section 212 can include within its enclosure and/or section space for a heating element, controllers, processors, circuits, distribution systems, fluid control systems such as solenoids, computing devices, hoses, lines, pumps, and/or other mechanical or electrical systems that allow for communication to various devices as well as control mechanisms to control fluids and/or a pump as well. The dispensing section 213 can also include a front, an area to allow for fluid to be dispensed, a heating device, a display, a computing device, hoses, lines, and/or other mechanical or electrical systems as well as dispensing mechanisms.

The beverage dispenser 200A can also include a display 219 that can allow for the displaying information, or advertising as well as providing an interface for the modification or control of control signals and/or commands that can allow for user or customer interactions and/or maintenance. In at least one embodiment, the beverage dispenser 200A also includes a brewing container 218 that allows for the traditional brewing of beverages and/or also allows for the mixing of fluids or substances for a beverage such as sweeteners, syrups, flavors, and other substances to be added to the beverage and/or mixed with the brewed or other fluids to provide a beverage 201.

The beverage 201 can also be dispensed into containers 215A, 215B, 215C (collectively 215). These beverage containers 215 can also include a dispensing nozzle 216A, 216B, 216C (collectively 216). The beverage containers 215 along with the dispensing nozzles 216 can allow for the beverage 201 to be stored within the beverage containers 215 and dispensed via the beverage nozzles 216. The beverage containers 215 can also be distributed throughout a store, for example, in a fast food type restaurant at the drive-thru window and in the restaurant beverage location after the preparation, brewing, or mixing of a beverage 201.

The beverage dispenser 200A can also be housed in one location such as behind a counter to allow for brewing, preparation, or mixing of different beverages. The beverage container 215 can then be placed in another location such as a drink station that will allow beverages to be dispensed from the beverage container 215 through the beverage nozzles 216. In at least one embodiment, a beverage container 215 can also include a beverage container cover 217A and 217C (collectively 217). In at least one embodiment, the beverage container cover 217 can also include a reservoir section or a beverage receiving section (not shown) that will allow beverage container covers 217 to remain in place during the dispensing of a beverage 201. For example, the reservoir section can allow for a liquid to be poured into the beverage container, in a funnel like manner to prevent spillage and/or loss of the beverage. In other embodiments, the beverage container cover 217 may be removed to allow for a beverage container 215 to receive a beverage 201. A power button 290 and/or power receiving can be incorporated within or along the control section 212.

Figure 2B:
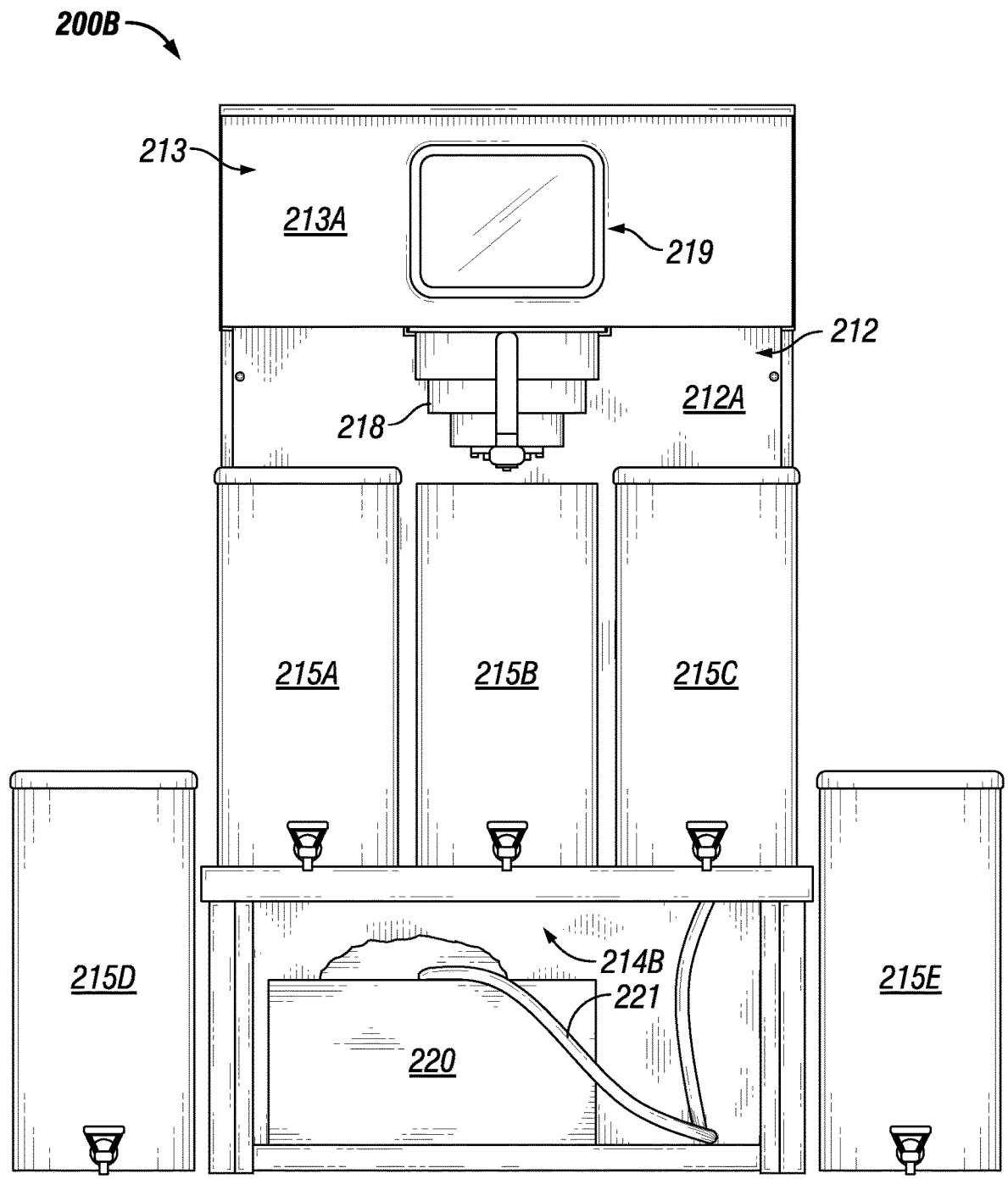
FIG. 2B is a front view of the beverage dispenser.

FIG. 2B is a front view of the beverage dispenser 200B in accordance with an embodiment of the present disclosure. The beverage dispenser 200B can include an enclosure 211, and in at least one embodiment the enclosure 211 can also include a base enclosure 214B, a control section 212, and a dispensing section 213. The base enclosure 214B may incorporate one or more bag in a box (BIB) 220 as well as a hoses or connectors 221. In at least one embodiment, the base enclosure 214B may incorporate two (2) BIB(s) 220 and corresponding hoses and connectors 221. In other embodiments, the base enclosure 214B can house three, four, five, six, seven, eight, nine, and/or ten BIB(s) 220 and appropriate hoses and connectors 221. In at least one version, the hose or connector 221 may also be considered a machine run (or pressurized run to a dispenser or nozzle) as it can allow for the connection from the BIB 220 to the beverage dispenser 200B via control section 212 and/or dispensing section 213. It should be noted that the hose and/or connector 221 or machine run need not run outside of the beverage dispenser 200B and can be completely self contained. The length of the hose and/or connector 221 in a machine run version would be less than 5 feet, or more preferably less than 3 feet, and most preferable less than 1 foot in length.

Base enclosure 214B can provide support for the beverage containers 215A, 215B, 215C (collectively 215) additional beverage containers 215D and 215E can be placed to the sides of the base enclosure 214B in a position to allow for a beverage to be dispensed. Beverage containers 215 can rest on the top of the base enclosure 214B and can also be interchanged depending on what beverages are to be brewed and/or stored on top of the base enclosure 214B. For example, the beverage container 215A, 215B, 215C may be placed upon the base enclosure 214B to allow for brewing and/or mixing and/or dispensing of three different beverages while beverage containers 215D and 215E are placed in a remote location from the beverage dispenser 200B for dispensing beverages that are stored within the beverage containers 215 after dispensing and/or brewing is completed.

The control section 212 of the enclosure 211 can include and/or house a heating element, controllers, processors, circuits, distribution systems, fluid control systems such as solenoids, computing devices, hoses, lines, pumps, and/or other mechanical or electrical systems that allow for communication to various devices as well as control mechanisms to control fluids and/or a pump (not illustrated). The control section 212 can also provide support to the beverage containers to prevent the beverage containers from going too far and/or sliding to the rear of the beverage dispenser 200B. In at least one embodiment, the user may place and/or slide a beverage container 215 until it stops against a front panel 212A of the control section 212.

The base enclosure 214B may be the bottom or bottom section of a beverage dispenser 200B and have a top, bottom, first side, second side, front, and/or rear (not illustrated). The control section 212 may also have a front side, back side, first side, second side, as well as a top and bottom. In at least one embodiment, the control section can be formed by a portion of the top of the base enclosure 214B. Similarly, the top of the control section 212 may also not have a material that individually covers it as it may also be formed by a portion of the dispensing section 213. In at least one embodiment, the top of the base enclosure 214B may cover a portion of the top of the base section 214B allowing for an opening from the base section 214B into the control section 212, or the bottom of the control section 212. Similarly, the control section 212 may have a portion of its top open to the dispensing section 213, and/or the bottom of the dispensing section 213.

The dispensing section 213 may also include on a front side 213A, a display 219 that will allow for advertisements for customer and/or maintenance interaction with the beverage dispenser 200B. For example, the display 219 may be an interactive tablet or other computing device including but not limited to, a phone, processor, controller, tablet, laptop, or other computing device. A user may interact and/or interface with the display 219 indicating the beverage dispenser 200B is to use a specific recipe that may include incorporating sweeteners and/or flavorings from a BIB 220 through various connectors and connections that may also be dispensed from the dispensing section 213 into a brewing container 218. The brewing container 218 may also be supported or held by a support structure (not illustrated) incorporated within a portion of the bottom of the dispensing section 213.

Figure 3:
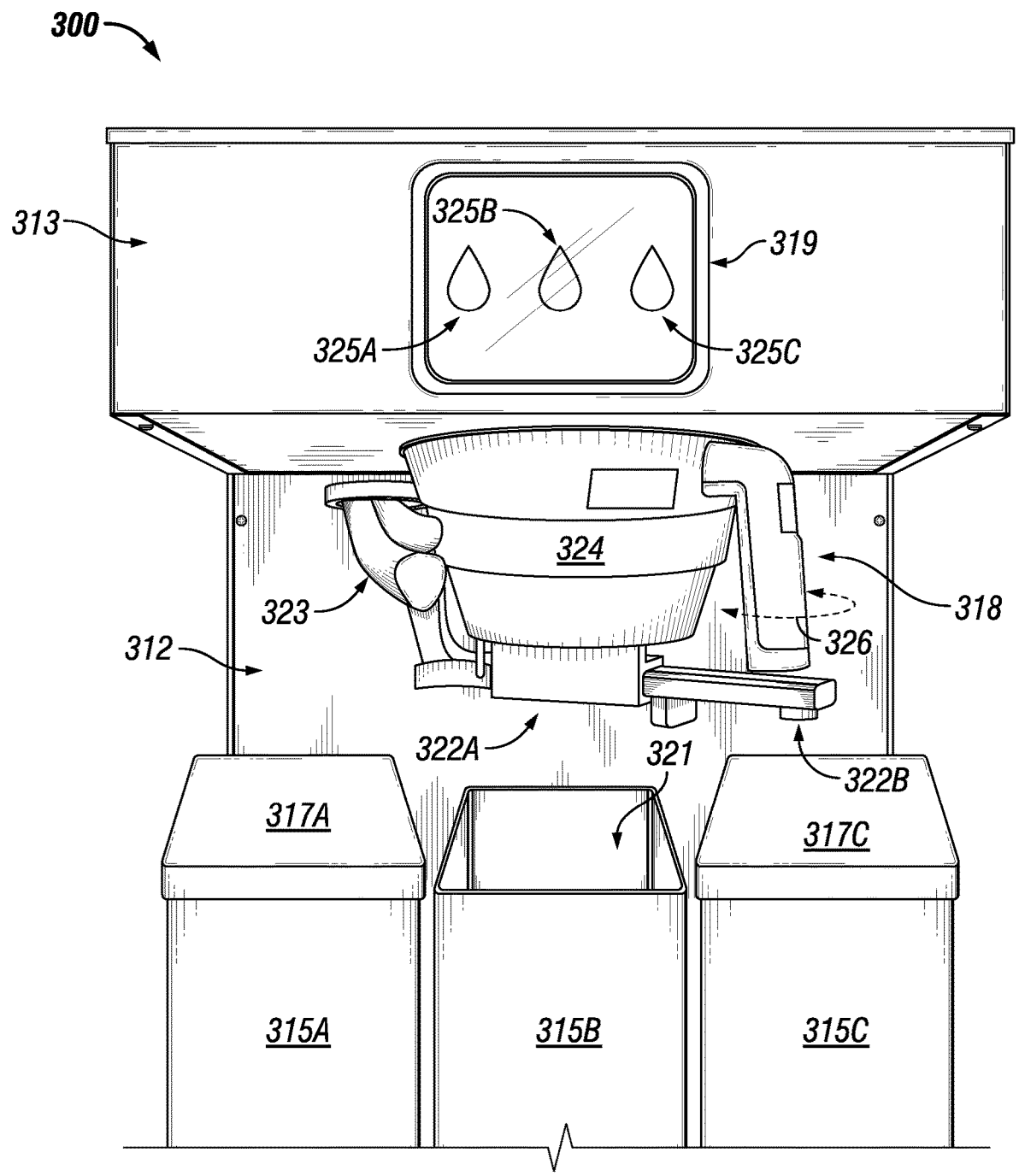
FIG. 3 is a front view of the top portion of a beverage dispenser.

FIG. 3 is a front view of the top portion of a beverage dispenser 300 in accordance with an embodiment of the present disclosure. The beverage dispenser 300 may have a control section 312 and dispensing section 313, in addition to other section(s) not illustrated. The dispensing section 313 may incorporate a display 319, and beverage dispenser(s) (not illustrated). The display 319 may include and/or display brewing controls 325A, 325B, 325C that can allow for interaction and/or interfacing with users, customers and/or maintenance personnel. In addition, the display 319 can also allow for displaying information related to, control systems, maintenance systems, advertising and/or other forms of reports, controls and/or logs. For example, the display 319 may have an interaction for brewing controls, such as lightly sweetened tea 325A, unsweetened tea 325B, or flavored or highly sweetened tea 325C.

These interactions can also include indicating whether a beverage container such as beverage container(s) 315A, 315B, or 315C (collectively 315) are in a dispensing position, and/or which individual brewing container 315 into which the beverage is being brewed, mixed or prepared. The dispensing section 313 can include at least one dispenser and/or dispensing nozzle (not illustrated) that allows for the dispensing of a fluid into a brewing container 318. The brewing container can have a mixing section 323 and/or brewing section 324. For example, a beverage (not illustrated) may include a hot fluid (not illustrated) dispensed through the brewing section 324 that may need to be sweetened or flavored via a mixing fluid (not illustrated) dispensed through a mixing section 323. In at least one embodiment, the output of the brewing section 324, and the output of the mixing section 323 may come together at a blending point 322A that can then allow for a beverage or blended output 322B.

Fluid can be dispensed into the brewing container 318 through the brewing section 324 that can allow for materials such as loose leaf tea, a tea bag or other type of brewing element(s), such as coffees, hot chocolate or cocoa, and/or hot ciders to be brewed and/or steeped, or allowed the time for a fluid to be filtered through the brewing container 318. Hot water can be filtered through the brewing element. A fluid may be dispensed from the dispensing section 313 through the brewing container 318 and flow directly and/or be mixed with another fluid and then dispensed from a beverage or blended output 322B.

The output 322B can allow for beverage to be dispensed into a beverage container reservoir such as beverage reservoir 321 of the beverage container 315B. Each of the beverage containers 315 may also incorporate a beverage container cover 317A, 317C (collectively 317). The output 322B can also be directed to any of the beverage containers 315. For example, the brewing container 318 may be rotated through a brewing container rotation 326 to allow the output 322B to be directed over the brewing container 315A, 315B, or 315C. It would be understood, other brewing containers could also be incorporated, such as those not illustrated to include additional beverage containers as well.

For example, the dispensing section 313 can have a support structure (not illustrated) for the brewing container 318. That support structure (not illustrated) may also incorporate sensors that may be coupled to a control unit and/or controller that will indicate which brewing container 315A, 315B, or 315C that the brewing container 318 is prepared to dispense into. In other embodiments, a user will have to indicate through interaction with the display 319 as to which brewing container 315A, 315B, or 315C the output 322B is directed over. In at least one embodiment, the display 319 will provide a user with instructions for which brewing container 315, and at which position the brewing container 315 should be for the beverage being prepared.

Figure 4:
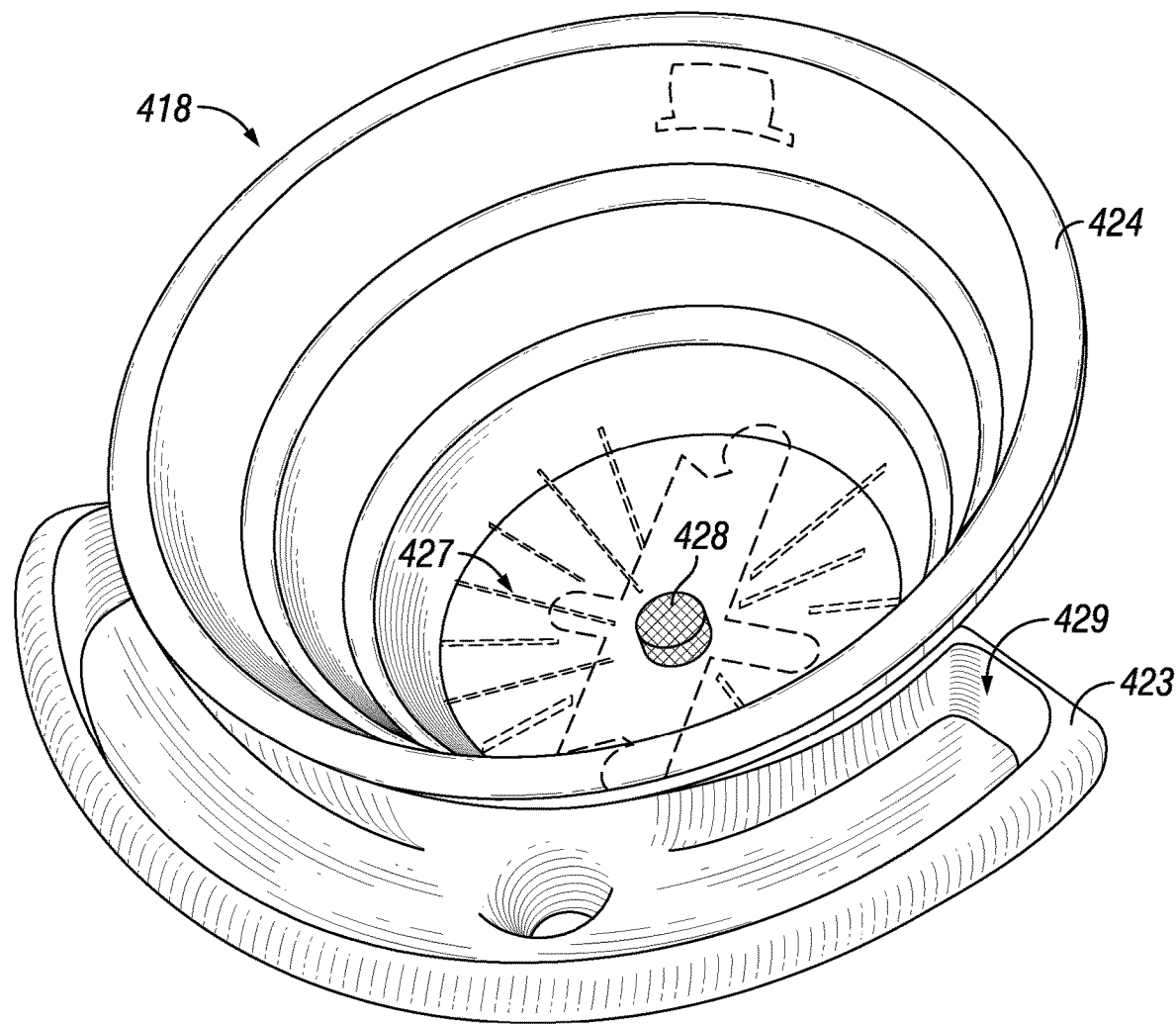
FIG. 4 is a perspective view of a brewing container.

FIG. 4 is a perspective view of a brewing container 418 in accordance with an embodiment of the present disclosure. The brewing container 418 can include a mixing section 423 and a brewing section 424. The brewing section 424 can incorporate a brewing reservoir 427 and a brewing filter 428. For example, a fluid such as hot water may be dispensed into the brewing section 424, and/or the brewing reservoir 427 in which brewing materials, such as loose leaf tea, tea bags, coffee, hot chocolates, spice tea, cider, have been placed. The brewing reservoir 427 can then be used to allow the hot water to steep the brewing material and then the brewed beverage or fluid can be dispensed through the brewing filter 428 to prevent any form of loose leaf or any other brewing material or substance from being incorporated within the beverage.

The mixing section 423 can include a mixing reservoir 429. The output (not illustrated) of the mixing reservoir 429 may be incorporated or coupled to the output of the brewing filter 428 and/or brewing reservoir 427 allowing a mixing fluid and/or brewed fluid to be blended together to create a mixed, brewed, and/or blended beverage. For example, water may be dispensed into the brewing reservoir 427 where an unsweetened tea bag is placed to be steeped. As the tea is dispensed through the brewing filter 428, a sweetener or fruit flavor may be added into the mixing section 428 through the mixing reservoir 429 and then mixed, blended, or incorporated with the output of the brewed beverage through the beverage filter 428 allowing the brewed beverage to be sweetened or flavored. In other versions, the sweetener or flavoring may be mixed with hot and/or cold water in the mixing reservoir 429 and dispensed together with the output from the beverage filter 428 allowing the brewed beverage to be sweetened or flavored. In at least one embodiment, the sweetener, flavoring, or other fluids or substances that are added to the mixing reservoir 429 may be performed before (pre-mix), during, or after (post-mix) a brewing.

Figure 5:
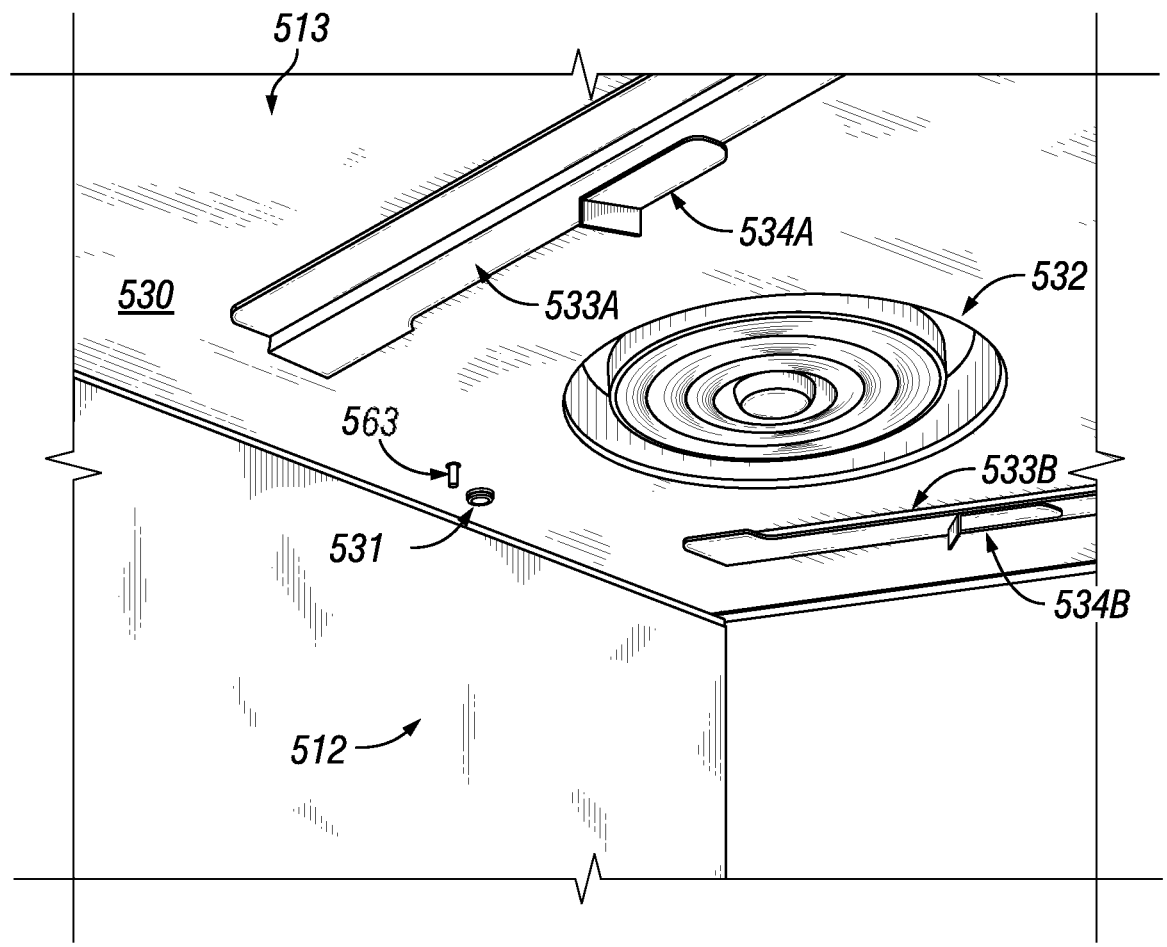
FIG. 5 is a bottom perspective view of the control section and dispensing section of a beverage dispenser.

FIG. 5 is bottom perspective view of the control section 512 and dispensing section 513 of a beverage dispenser in accordance with an embodiment of the present disclosure. The control section 512 can support and/or be coupled to the dispensing section 513. For example, the control section 512 may have an opening or have its top partially opened to the bottom 530 of the dispensing section 513 or all of the dispensing section 513. Dispensing section 513 may have a bottom 530 that may be fully or partially covered by a plate or some other material that may include metal, plastic, carbon fiber and/or other such materials. The bottom 530 allows for the dispensing of different types of fluid into a brewing or beverage container.

For example, the bottom 530 may include a mixing fluid dispenser 531 and/or heated fluid dispenser 532. In some embodiments, the bottom 530 may have a stop pin 563 that prevents the brewing container (not illustrated) from being placed against the controller section 512, being placed out of position for the mixing fluid dispenser 531 and/or being placed out of position for the heated fluid dispenser 532. In at least one version, the mixing fluid dispenser 531 and the heated fluid dispenser 532 can dispense two different and/or separate fluids. In some embodiments, the mixing fluid dispensed may include sweeteners, syrups, flavors, or other forms of substances to be added or mixed to another fluid pre or post dispensing, heating, and/or brewing. While in other embodiments, the mixing fluid dispenser 531 can allow for the dispensing of a heated fluid. For example, in the summer months water may be naturally warm or heated, and that fluid would be allowed to pass through the mixing fluid dispenser 531. The heated fluid dispenser 532 may dispense hot water or other hot beverages that may also incorporate some form of sweetener, flavor, syrup or other substances as well. For example, a fluid may include various particulates, or may have small amounts of sugars or other substances mixed prior to heating. In at least one example, the heated fluid dispenser 532 may also include a shield or some form of flash shield to prevent heated fluid from creating steam or other hazardous splashing of a fluid.

The bottom 530 of the dispensing section 513 may also provide support for a brewing container through, for example, brewing container support 533A and 533B (collectively the brewing container support 533). These brewing container supports 533 can be formed as brackets that may be coupled to or fastened to the bottom 530 of the dispensing section 513 or they may also be incorporated and molded or manufactured directly into the bottom 530 of the dispensing section 513. There can also be a brewing container rotational limits 534A and 534B (collectively container rotational limits 534) to prevent a rotational movement of the brewing container (not illustrated) that would exceed specific limits and allow a dispensed beverage to miss beverage containers (not illustrated). In at least one embodiment, the brewing container rotational limits 534 may also include and/or incorporate sensors or other indicators or couplings that will allow an indication of which side or at which point the brewing container is positioned. These sensors and/or indicators may then be coupled to a control circuit or system (not illustrated) to prevent a beverage from being dispensed into a beverage container that is, for example, not in the proper position and/or is not prepared to be filled because it is already filled or not in place, for preventing spills. Additionally, the bottom 530 and/or the beverage containers (not illustrated) may include sensors that would allow a control circuit or system (not illustrated) to determine if a beverage container is in the proper position, and/or how much fluid is held within the beverage container reservoir.

Figure 6:
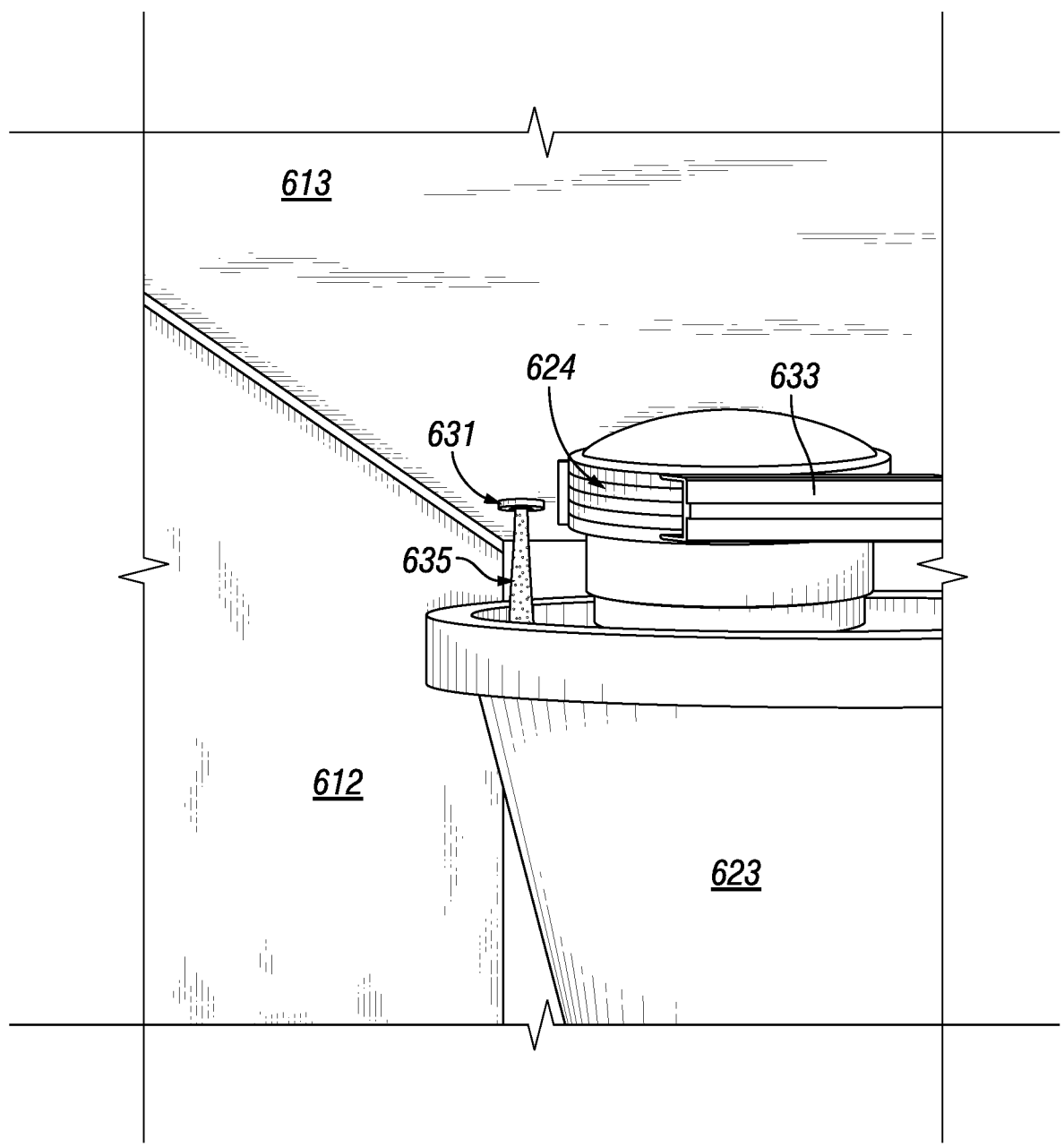
FIG. 6 is a side view of the mixing section of a brewing container and dispensing section showing a mixing fluid being dispensed into the mixing section.

FIG. 6 is a side view of the mixing section 623 of a brewing container (not illustrated) and dispensing section showing a mixing fluid 635 being dispensed into the mixing section 623 in accordance with an embodiment of the present disclosure. Included is a control section 612, and dispensing section 613 of a beverage dispenser (not illustrated). For example, the brewing container as illustrated in FIG. 4. can have mixing section 623 for receiving a mixing fluid 635 within a mixing fluid reservoir such as reservoir 429 that is located within the mixing section 623. The mixing section 623 may be coupled with a brewing section 624. The brewing section 624 can be supported by a support structure 633.

The control section 612 may incorporate sensors that can sense and/or provide an indication or signal when the mixing section 623 is in a position to allow for a mixing beverage fluid 635 to be dispensed into a mixer reservoir (not illustrated). For example, in at least one embodiment, there may be a single or multiple mixing fluid reservoirs within the mixing section 623 that allow for different or separate mixing fluids 635 to be dispensed into the mixing section 623 simultaneously or at different times. These sensors may provide an indication of which individual mixing reservoir is positioned underneath the mixing fluid dispenser 631 and if the mixing section or mixing reservoir is not in position to prevent the mixing fluid from being provided and/or stop the brewing, mixing, or beverage dispensing process to take place.

Figure 7:
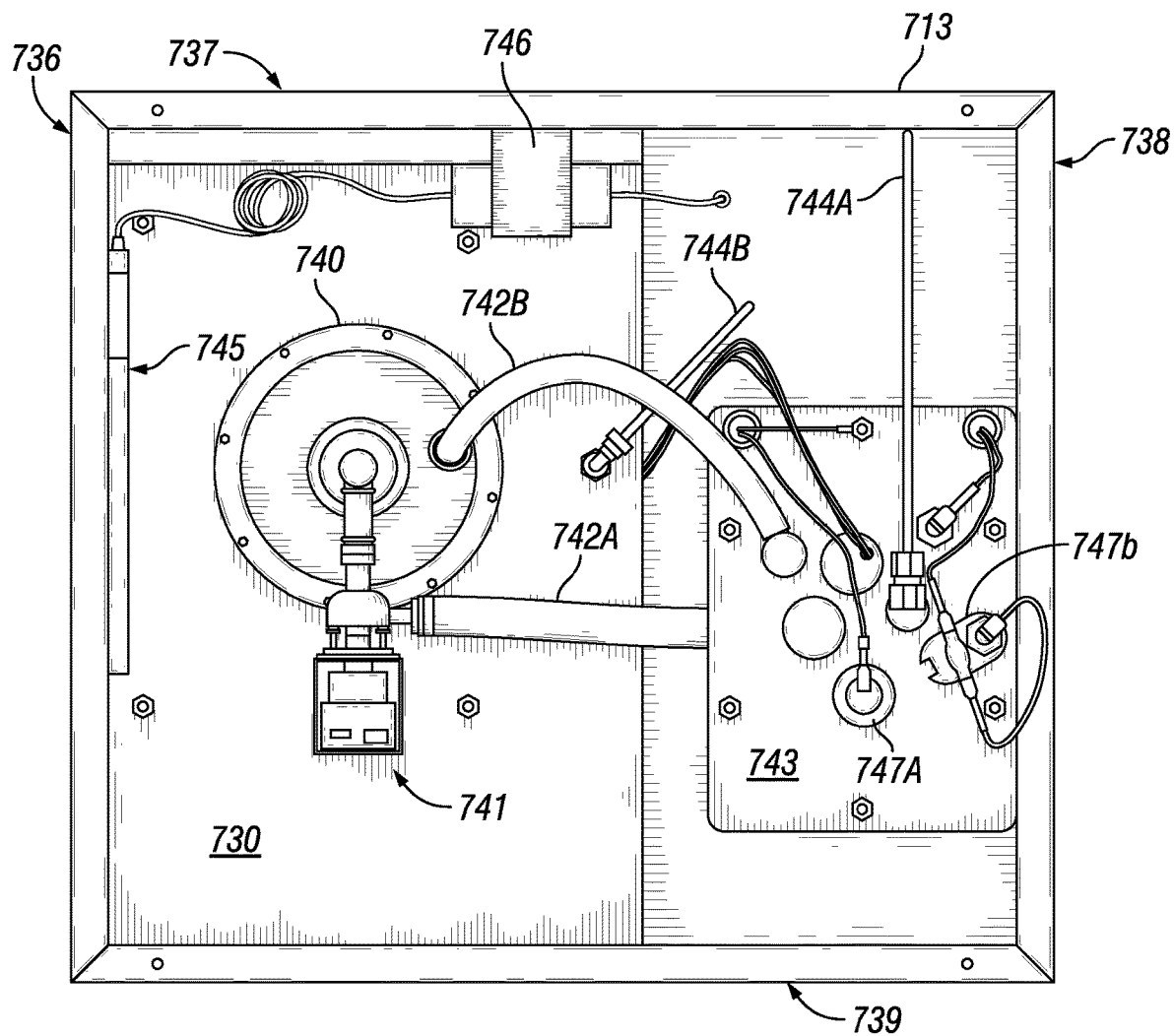
FIG. 7 is a top view of the dispensing section of a beverage dispenser.

FIG. 7 is a top view of the dispensing section 713 of a beverage dispenser in accordance with an embodiment of the present disclosure. The dispensing section 713 may have a front side 736, first side 737, second side 739, and a rear side 738. The dispensing section 713 can have a bottom 730 as well as a top (not illustrated) to allow an internal view or access to the dispensing section 713. The bottom 730 of the dispensing section 713 can cover all or a portion of the dispensing section 713 to allow for the dispensing section and/or portions of items incorporated and/or housed within the dispensing section 713 to also include connections or couplings into the control section (not illustrated).

The dispensing section 713 can have a heated fluid dispenser 740. The dispensing section 713, can have at least one heated fluid line, such as 742A and 742B flowing to it. For example, heated fluid line 742A can have a solenoid 741 that can allow for two different values and/or levels of heating temperature. In at least one embodiment, the heating device 743 can have multiple heating sections that allow for a fluid to be heated to two different temperatures and distributed with heated fluid lines 742A/742B. In another example, the heated fluid line 742A can be controlled through solenoid 741 to allow for a super-heated or higher temperate fluid than the heated fluid that flows along the heated fluid line 742B. The heated fluid lines (collectively 742) can be coupled to the heating device 743 that can provide a heated fluid to the heated fluid dispenser 740. In at least one embodiment, the heating device 743 can be a hot water heater that is controlled or heated through electrical power, gas or some other fluids or gases that can provide heat such as natural gas or propane or some other flammable fluids or gases. The heating device 743 may output heated fluid through the heated fluid lines 742 and have inputs from fluid line such as 744A and/or 744B (collectively 744).

The fluid line 744B can be coupled to a second fluid dispenser (not illustrated, while fluid line 744A can provide fluid to the heating device 743. Collectively the fluid line 744 can provide water or other fluids to the beverage dispenser device for mixing, heating, or other beverage preparation purposes. The beverage dispensing device can also have a computing device 745 that has a computing device power source 746 that can be coupled to a power system or power distribution system (not illustrated). Power control line 747A and 747B can also be coupled to the power lines and/or control or firmware lines and can provide control signals and/or power to the heating device 743.

In at least one example, water is provided through the fluid line 744A to the heating device 743 which is controlled and powered by a controller or computing device (not illustrated) that can be activated by the computing device 745 or other controller, firmware controllers, processors, or computing devices. Water that is provided through the fluid line 744A to the heating device 743 can then be heated and provided to the heated fluid dispenser 740 by one of the heated fluid lines 742 to be dispensed into a brewing device or brewing container (now illustrated) that can be used to brew, steep, and/or prepare any forms of teas, hot cocoas, coffees or other types of beverages or may provide heated water that can be dispensed for other purposes. Fluids, such as water may also be provided through fluid lines 744B and may also be dispensed through another dispenser such as a mixed fluid dispenser (not illustrated). This fluid may also be water, syrups, sweeteners, flavors, or other substances that can be incorporated into or mixed into a beverage. The user may activate the heating device 743 through a computing device 745 which may incorporate a camera and/or display unit that allows interactions or controls from a user that can indicate and activate certain operations of the beverage dispensing device (not illustrated).

Figure 8:
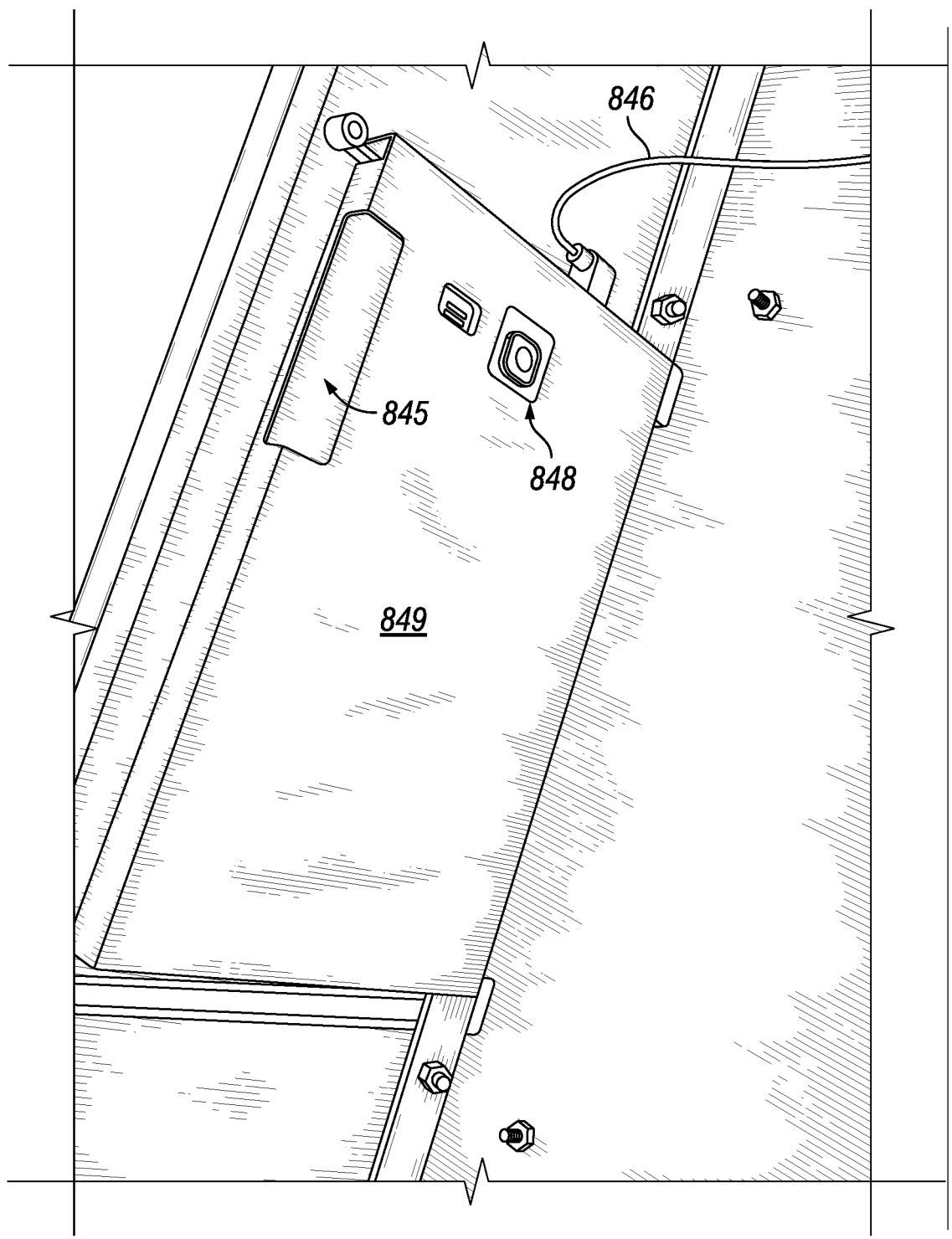
FIG. 8 is a perspective view of a mounting system for attaching the computing device.

FIG. 8 is a perspective view of a mounting system for attaching the computing device 845 in accordance with an embodiment of the present disclosure. The computing device 845 may be housed in the base, control, or dispensing sections. The computing device 845 can include a camera 848 and/or power source through a computing device power line 846. In at least one embodiment, the computing device power line 846 can also incorporate a plug, adapter, or transformer device that allows for the conversion, and/or conditioning of power from another source such as an AC line or DC line to the proper regulated power level for the computing device 845.

The computing device 845 can include a camera 848 that may be facing forward or backwards that has a slot within the computing device holder 849 or an opening that allows the camera to be accessed or utilized to scan or take pictures or be activated remotely when certain activities are occurring with the beverage dispensing device (not illustrated). For example, sweeteners and other flavors and items that are stored in a bag in a box (BIBs) can be incorporated and stored within the base section or enclosure of the beverage dispensing device (not illustrated). In at least one embodiment, these BIBs and/or their labels with barcode or other designs can be recorded, visually captured, and/or have a design or indicator captured by the camera 848 and transmitted to the control system. The transmitted design or data can allow a control system (not illustrated) to know which BIBs have been inserted and/or coupled to the beverage dispensing system as well as how often a new BIB replaces older BIBs that may have run out of syrups, flavors, sweeteners or other substances.

These designs can include QR codes, bar codes, or other similar printed or display data capture or storage devices, such as a number system scheme, code system, or just provide label verification to know when a specific BIB has been utilized for the beverage dispensing device (not illustrated). The camera 848 or the computing device 845 to incorporate that information or image taken of the code or information from the label that is provided and/or stored on the computing device 845 or uploading it to the cloud or other server or databases through a wireless or wired connection over a computer network such as a wireless local area network (WLAN) or local area network (LAN) that may be coupled to the internet or other forms of communication of protocol such as Bluetooth, zigbee, near field communications or other communication systems or devices. In at least one embodiment, the computing device 845 is held in position by computing device holder 849 sized to hold and incorporate the computing device 845 within a void defined by and that can house the computing device within the computing device holder 849.

Figure 9A:
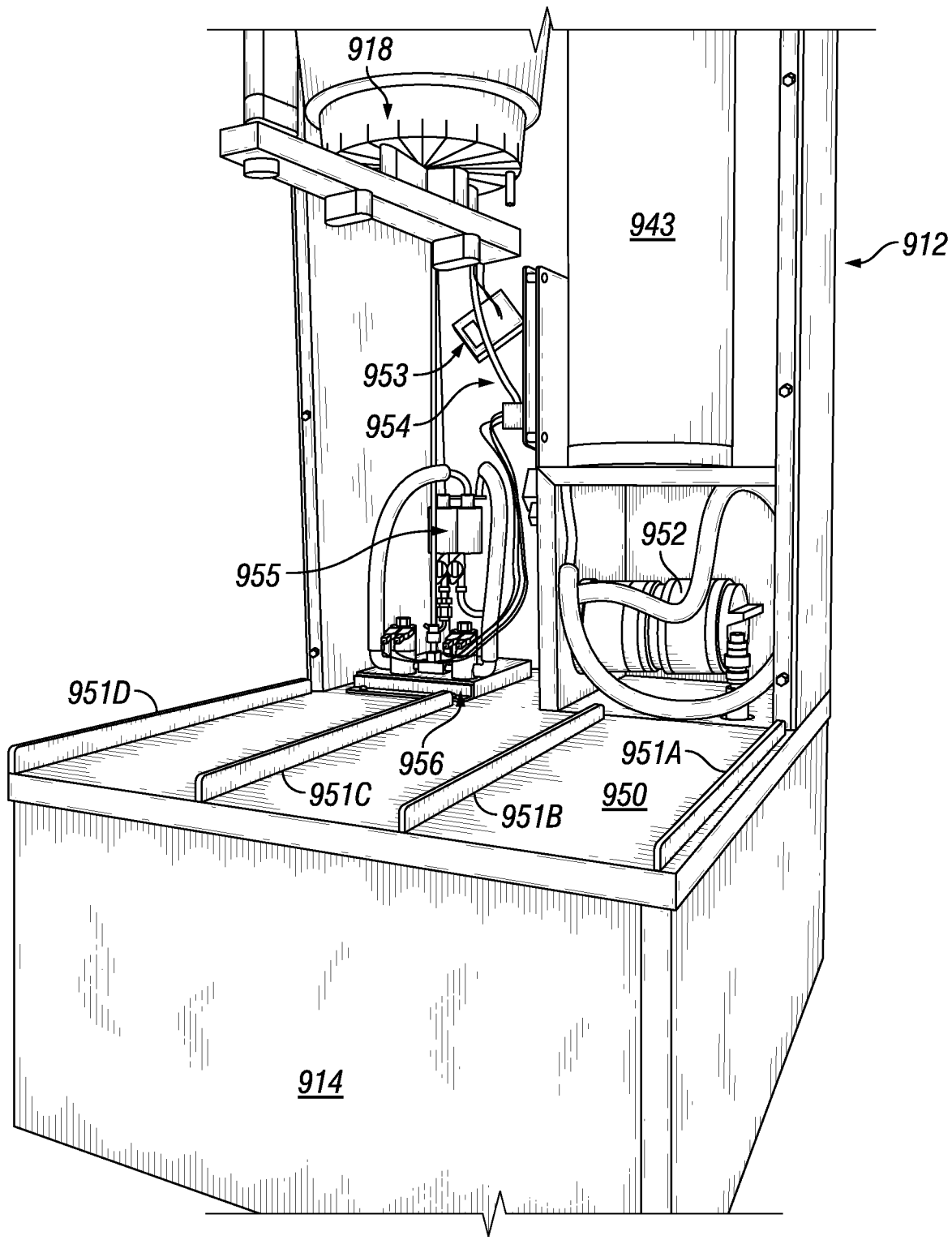
FIG. 9A is a perspective cutaway view of a control section of a beverage dispenser.

FIG. 9 is a perspective cutaway view of a control section 912 of a beverage dispenser in accordance with an embodiment of the present disclosure. Control section 912 can be incorporated or coupled to the base section 914 and/or dispensing section (not illustrated). The control section 912 can also incorporate a front panel (not illustrated), first and second side panels, as well as a rear panel, top and bottom that provides protection and encloses the control section 912. The top of the control section 912, can be partially exposed to the bottom or into the enclosure of the dispensing section (not illustrated).

The control section 912 can house a heating device 943 as well as control circuits 954 and communication circuits 953. These circuits can be utilized to communicate with, control, and/or distribute power as well as control signals via controllers, processors or computing devices. In at least one embodiment, the control circuit 954 can be electrically coupled through the communication circuit 953 to a computing device (not illustrated). The computed device (not illustrated) may also be utilized to interact with a user and/or maintenance personnel in such a way to activate the beverage dispensing device (not illustrated) when a brewing activity is to occur which will activate the heating device 943. A pump 952 can be utilized to couple an item or input, such as a bag in a box (BIB) (not illustrated) stored within the base section 914 to provide these fluids stored within the BIB, to a fluid control system 955.

The fluid control system 955 can also be coupled through various hoses and/or lines to fluid solenoids 956 to provide and control fluid distributions to other elements such as a heating device 943 and/or other dispenser such as the mixed fluid dispenser (not illustrated). The fluid control system 955 and/or the fluid solenoids 956 can be controlled through the control circuit 954 and/or can be electrically coupled to the control circuit 954 or the communication circuit 953. As fluids are distributed, they can be dispensed through the brewing container 918 into beverage containers placed on and supported by the base section 914. These beverage containers (not illustrated) can be placed into sections placed on the top 950 of the base section 914. The top 950 can include the beverage container guides 951A, 951B, 951C, 951D, (collectively 951) that can prevent the beverage containers from being placed into a position that cannot be utilized or would create a safety hazard as fluid would be dispensed onto the floor or the top of the base section 914.

Figure 9B:
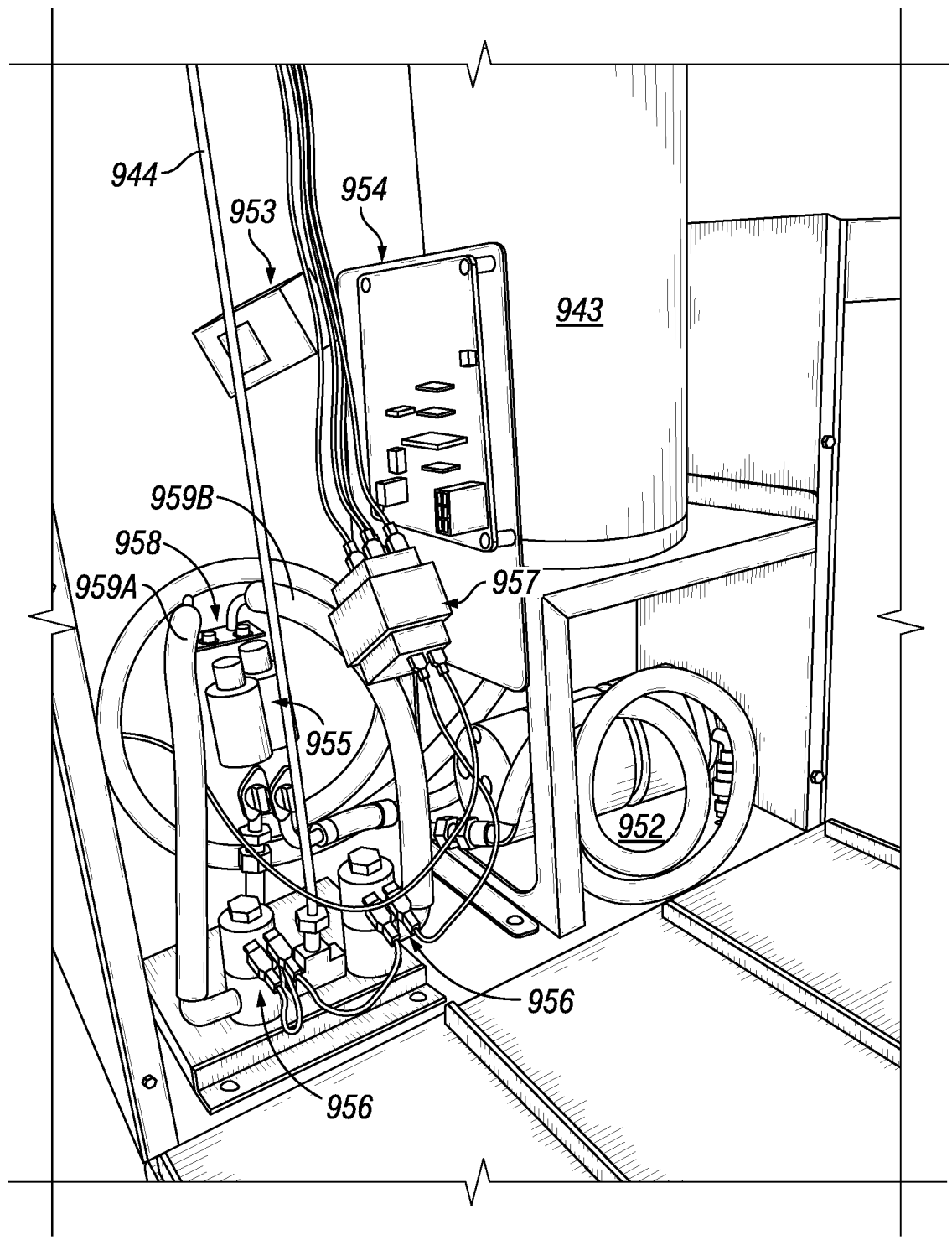
FIG. 9B is an alternative perspective view of a control section of a beverage dispenser.

FIG. 9B is an alternative perspective view of a control section 912 of a beverage dispenser in accordance with an embodiment of the present disclosure. The control section 912 can incorporate the heating device 943 as well as various circuits, fluid control systems or fluid control devices. For example, a pump 952 may be coupled to control circuit 954 and/or communication circuit 953. These circuits 953/954 can also be coupled to a distribution circuit 957. The distribution circuit can provide an input, output and other distribution mechanisms that allow for conversion of signals, voltages, and/or currents to various levels and/or conditioning for various circuit devices or systems.

For example, a pump 952 connected to a fluid distribution system 955 that can include fluid solenoids 956. These fluid solenoids 956 may be coupled to the fluid control system 955 through lines 959A and 959B. Fluids also may be coupled to the fluid control system 955 and/or fluid solenoids 956 through fluid inputs 958. Fluids then can be provided to the heating device 943 and/or dispensing mechanisms, nozzles or outputs through fluid lines 944. For example, a fluid such as water may be provided from the fluid input 959 then provided to the fluid control system 955 and then is coupled to the fluid solenoid 956 through a hose 959A or 959B (collectively 959). This hose 959 can then be coupled through fluid solenoid 956 which then can be controlled by the control circuit 954 and/or coupled to a communication circuit 953.

The control circuit 954, and/or communication circuit 953 can activate and allow the distribution of the fluid such as water through and/or to the fluid line 944 or the heating device 943. In same or other examples, fluids such as sweetener, syrup or flavoring or other substance may be provided through a pump or pressurized system to push and/or provide the sweetener, syrup, flavoring or other substance stored in the bag in a box (BIB) through a fluid control system 955 and/or fluid line 959. These fluids can then be controlled by a fluid control system 955 and/or fluid solenoid 956 and then provided to a dispenser, nozzle, output such as a mixed fluid nozzle or dispenser (not illustrated). The fluid solenoid 956 or fluid control system 955 and/or pump 952 may be controlled by the control circuit 954 directly or indirectly through the communication circuit 953 and/or distribution circuit 957. For example, the control circuit 954 may be coupled to computing device through a communication circuit 953. The communication circuit 953 can be electrically coupled to the control circuit 954. The control circuit 954 can be directly coupled to a pump 952, fluid control system 955 or fluid solenoid 956 and/or coupled through the distribution circuit 957 to allow for power conversion, for example, transformer, buck, boost, or buck boost converters, as well as synchronization of certain signals and/or voltages or currents from power converters.

Figure 10:
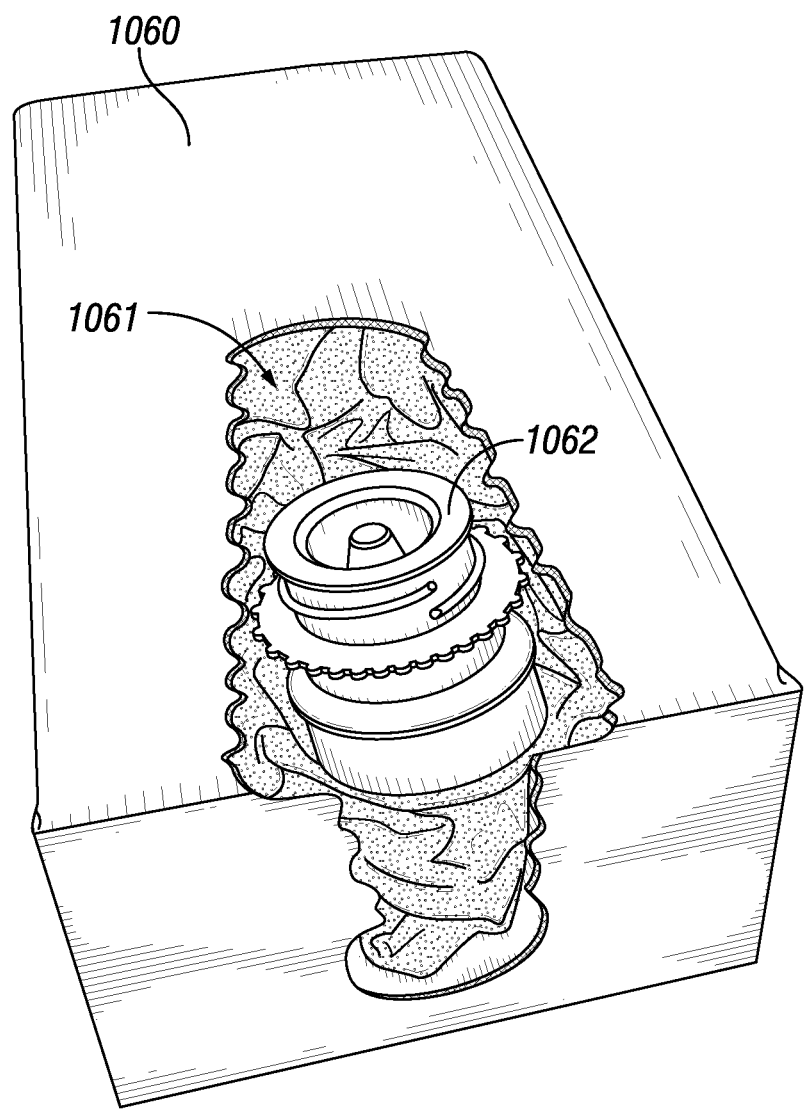
FIG. 10 is a perspective cutaway view of a bag in a box (BIB) or mixing box used with a beverage dispenser.

FIG. 10 is a perspective cutaway view of a bag in a box (BIB) or mixing box 1060 used with a beverage dispenser in accordance with an embodiment of the present disclosure. Mixing box 1060 can include a box that protects and/or houses a mix bag 1061 within a void defined by the mixing box 1060. The mix bag 1061 may include a mix bag connector 1062. Syrups, flavors as well as other substances including proprietary recipes of a beverage can also be shipped utilizing mixing box or bag in a box type systems such as 1060. These mixes and/or BIBs have a mixing bag that incorporates or stores the sweetener, syrups, or flavors as well as other recipes or other substance for flavoring a beverage. For example, these may be sweeteners or syrup such as certain flavor teas, such as peach, raspberry, lemon, lime or could also be sweeteners such as sweet-n-lo, sugar, or other liquid sweeteners, such as high fructose corn syrup or other types of flavorings. Additionally, such recipes can incorporate, for example, the secret recipe for Coke® or Pepsi® being incorporated as a syrup that can be stored in the mix bag 1061. These substances, flavors, sweeteners, or syrups are stored in the mix bag 1061 are typically required to be stored at specific temperatures and/or under specific pressures not to exceed certain values. Mix bag connector 1062 can also include a quick connector or other forms of connector to allow the mix bag to be connected to a hose or other type of fluid line or run to a beverage dispenser. In at least one embodiment, the mix bag connector can incorporate a sensor or other forms of switches or indicators to determine when the mix bag 1061 is empty and no longer has any syrups, sweeteners, flavors or other types of substances being distributed to beverage dispenser. The sensor(s) can also include a fluid viscosity, temperature, or flow sensor. The sensor(s) may also include an Radio Frequency Identification (RFID) tag in and/or around a connector, and/or a mating connector to allow the machine to know what has been attached.

Figure 11:
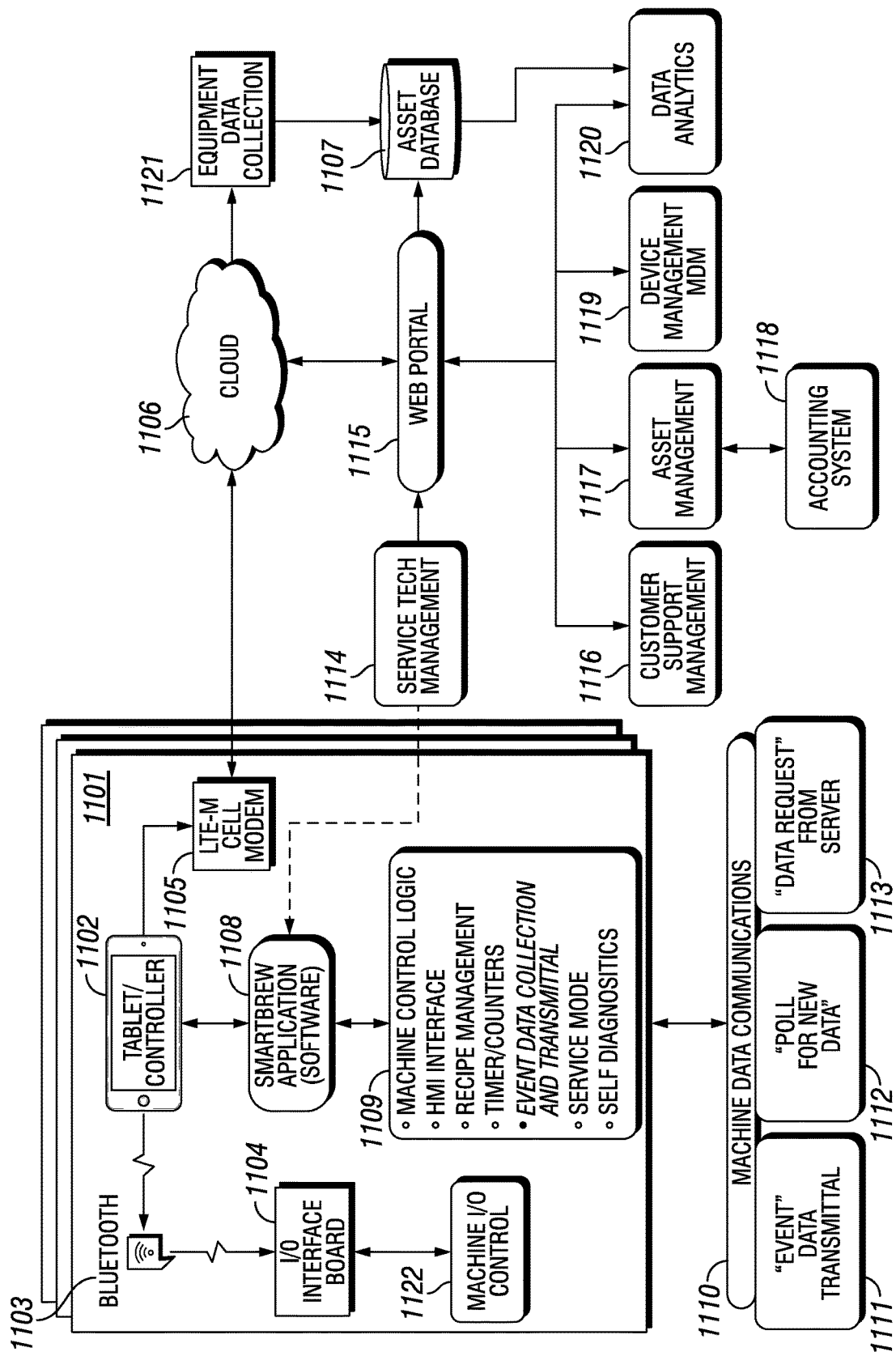
FIG. 11 is an architecture of a beverage dispensing system.

FIG. 11 is an architecture of a beverage dispensing system in accordance with an embodiment of the present disclosure. The beverage dispensing system can include a beverage dispenser module 1101. In at least one embodiment, the beverage dispenser module 1101 can be a beverage dispensing apparatus. The beverage dispenser module 1101 can also communicate with a cloud 1106, internet, or other communication protocol to a database system or server that will allow interfacing communication via remote application, and/or storage systems.

The beverage dispenser module 1101 can include a tablet or controller 1102 for providing a display, touchscreen, interactive, or interface system to allow users, staff and/or maintenance personnel to complete and/or view operations on or for the beverage dispenser module 1101. The tablet or controller 1102 can communicate via a wireless or wired connection to a communications circuit or system 1103. The communications system or circuit 1103 can allow for a wireless or wired connection to an interface board or control circuit 1104. Additionally, the tablet or controller 1102 can also communicate to a cloud, cloud storage, cloud database, or server system through a communication system such as a wireless cellular network circuit or system 1105. In some embodiments, the wireless cellular network circuit or system 1105 may be included within the communications circuit or system 1103.

The tablet or controller 1102 can also run a control process 1108. In some embodiments, the control process 1108 may include applications such as machine control logic, human machine interfacing, recipe management, timers and counters, operations for various beverage containers and/or brewing systems, event data collection and transmission, service operations as well as diagnostics 1109. Many of the operations or processes 1109 can be executed consecutively or in parallel. Many of the operations performed by the control process 1108 can also be managed remotely via wireless or wire connections or communication circuits or systems 1105,1103 that will allow communications through a cloud or internet based system 1106 to a portal system 1115, database system and/or server 1107.

The communication via the cloud 1106 through a wireless or wired network can allow database and/or server 1107 to store and collect data information 1121 as well as allowing for an interface, web portal system or graphic user interface (GUI) 1115. The interface, web portal system or graphic user interface (GUI) 1115 can allow for service technicians to communicate directly with the tablet or controller 1102 and applications system running on it to manage service operations 1114 and/or also receive data collections 1121. The web portal system 1115 can also allow for customer support management 1116, asset management 1117, device management 1119, data analytics 1120, as well as accounting systems 1118 interfacing and/or management. A user may also download new recipes, new graphics, and/or new configuration from the web portal system 1115, and/or agree to automatically download each of the new items, or a combination thereof.

All of these interfacing systems can also interface with database or server 1107 as well as communicating with the data collections system 1121. The data collections system 1121 can be used to generate automatic reports and/or analytics that can be stored in database 1107 or sent or received with the web portal system 1115 through the data analytics system 1120. Service technicians and service management, diagnostic management 1114 may communicate through a web portal system 1115 to the application or control process 1108 to perform maintenance and/or other service operations to the code and/or operations that are performed on or through the control process 1109. Some of these maintenance and/or other service operations can include also managing the beverage dispenser, operations through the control circuit or I/O interface board 1104 and/or the tablet or controller 1102.

The operations that can be performed through the interface board 1104 via the tablet or controller 1102 and/or control process 1108 can include controlling amount of water, turning the water on and off, the amount of sweeteners, turning the flows on or off, or controlling the individual amount of flow, water temperature, increasing or decreasing as well as maintaining operations, turning the pumps on and off as well as controlling pressures, various solenoids, power distributions and other operations. Additional communications may be made through the various communications systems such as 1105 or 1103 will allow for machine data to be communicated through the cloud 1106 and/or to the server and databases 1107. These machine data communications 1110 can include datasets from the machine and incorporate the data collections, diagnostics, reports such as recipes, brewing operations, BIB operations, and operational logs. Additional control of hardware, such as but not limited to, valves, switches, and/or relays or other devices can be made through at least one machine I/O control device 1122.

More specifically, event data 1111 can include information such as the address of the machine, serial number, what versions of the operations it is running and/or code that it is running, any type of machine status or error codes as well as event information such as day and time of each brew, brew recipes, which beverage container was used, was a bag in a box (BIB) used, what amount of sweeteners, what amount of water, what was the water temperature as well as including other fluids and/or substances, added flavors, any item that is operated or controlled can be included in the event data transmittal. Additional event data can include items such as brewing information or how many of the freshness timers have expired, the time between when a freshness timer expires and a new beverage container is filled with the same recipe, whether a BIB is empty, need for a filter replacement such as a water filter or fluid filter, and calibrations. Machine data communications 1110 can include polling of new data 1112 such as new recipe lists, recipe datasets, recipe configurations, recipe files, configuration files, configuration datasets, advertisement datasets, advertisement files, store dataset or files, global datasets or files, and/or new advertisements as stores can purchase and run advertisements from the tablet or controller 1102. If there is no new data to be downloaded then the beverage dispenser module 1101 continues to operate with the current versions of recipes, controls, and operations. Data requests from the server 1113 can be included with the machine data communications 1110. These data requests from the server 1113 can include information such as beverage dispenser status, any diagnostics and counters, any error logs, configurations, beverage dispenser history, filter status, freshness status, as well as include the remote disablement and enablement of the beverage dispenser.

For example, a global store owner may determine one of its franchisees is no longer operating within the bounds of the operational agreement for the beverage dispenser. The global owner can then trigger a disable command that would cause the franchisee's beverage dispenser to shut down, preventing use and allowing for the possible recovery of the machine. Much of the information that can be used from the machine data communications 1110 can be available and accessed through the cloud 1106 and databases 1107. Some of this information will be run through equipment data collection 1121 that can generate real time or on demand information as well as generating specific reports and controlling and triggering those individual devices.

The web portal 1115 may be utilized to allow for customer support management 1116 for diagnostics data collection and determining what support issues have been addressed or not. This can include checking to see if the beverage dispenser module 1101 and all the items housed within the beverage dispenser module 1101 and/or controlled are conforming to standards of operation. For example, a global operator may require a beverage to be brewed, every three hours but then discover that franchisees or individual store operators decided to only brew a beverage every five hours. These reports can then be generated and provided to the global store owners to allow them to enforce contractual obligations of the individual store operators. The asset management system 1117 can be accessed from the web portal 1115. In at least one embodiment, the asset management system 1117 can inform a user when new beverage dispensers, other machines or improvements are available. The asset management system 1117 may also connect with an accounting system 1118 to allow for inventory control, parts management, machine cycles, etc. This can allow for the beverage dispenser to be timely refurbished and/or insure the store, restaurant or other location is being properly stocked with the adequate amounts of supporting products or provide for automatic shipment of more BIBs, for example.

The accounting system 1118 may be coupled to the web portal 1115 through the asset management system 1117 or may be directly coupled to the web portal 1115, or the cloud 1106. Device management 1119 may also be performed from the web portal 1115. Some of the device management 1119 that may be performed such as operation or maintenance of the tablet or controller 1102 operating systems and/or other applications such as the controller applications or processes 1108 maintaining advertisements through an advertisement database or download management system. Diagnostics may be stored within the database or server included in the device management side, kiosk management, location information as well as usage data can also be incorporated in that data management. Much of the device management 1119 can be incorporated into reports that will allow for control operations as well as communicate with the data analytics 1120 that may provide assets, or service reports, compliance reports, and/or support reports. Device management 1119 and data analytics 1120 can also interface with the database and/or servers 1107 or directly to a beverage dispenser module 1101 through an internet or cloud system 1106 and/or communication systems 1103 and 1105.

Figure 12A:
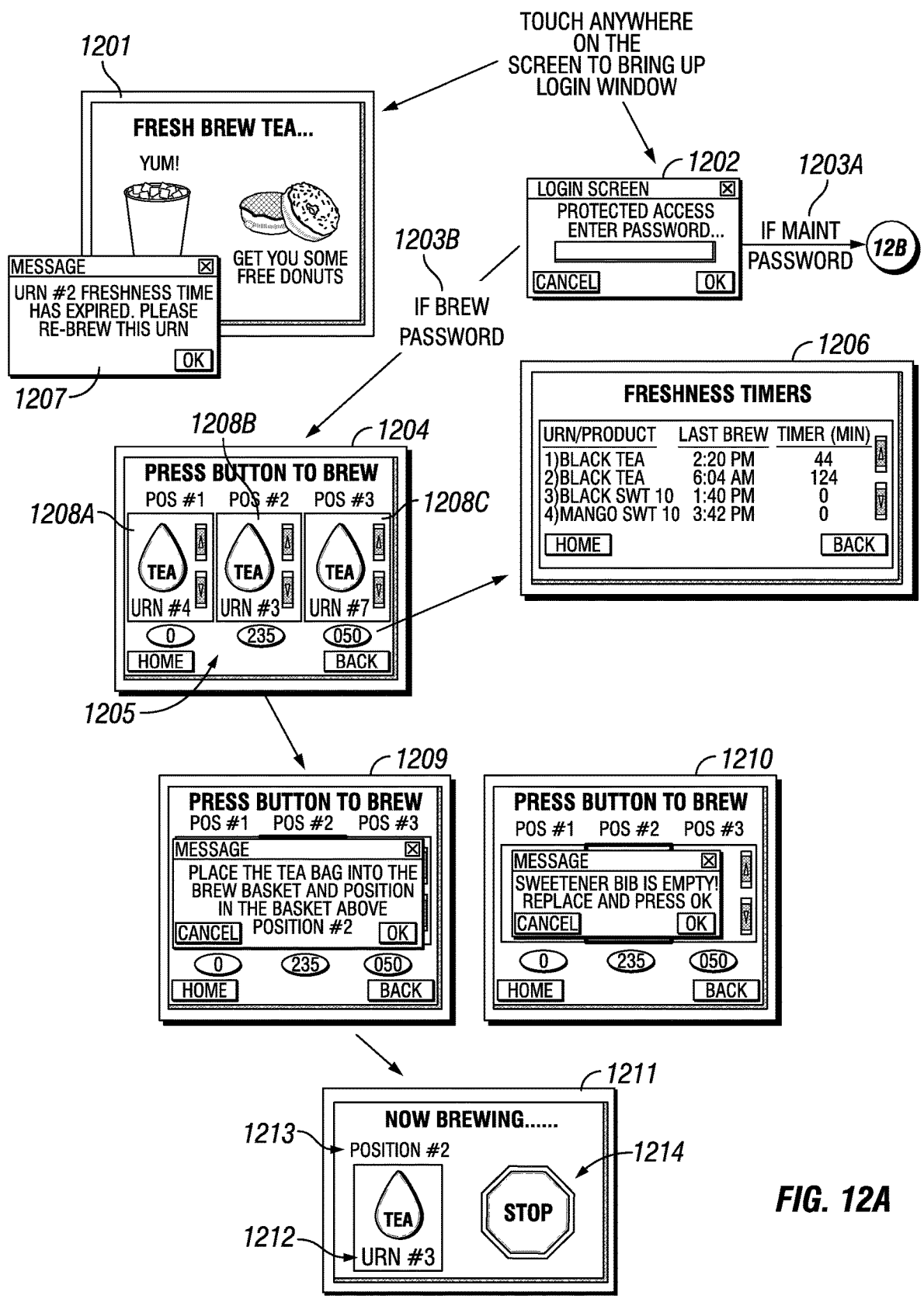
FIG. 12A is an illustration of menus showing a possible operational flow of a beverage dispenser.

FIG. 12A is an illustration of menus showing a possible operational flow of a brewing dispenser in accordance with an embodiment of the present disclosure. The operational flow can begin with a display 1201 such as that from a tablet, computing device, process or controller, that may provide some advertisements such as illustrated at 1201 or indicate when certain events or special promotions or any other type of activity or advertisements that are desired. A user, can touch or interact with the display initiating a login screen 1202 that will allow the user to either indicate, or provide a login and/or password. Depending on the password entered the person interacting with the beverage dispenser or display, is a store operator or maintenance personnel, they may indicate, or provide a login and/or password for maintenance 1203A or the store 1203B. A store operator password 1203B (or brew password) will allow the operator to begin operations related to the recipes and/or controls regarding the beverage dispenser.

A beverage preparation screen 1204 can include indicators 1208A, 1208B, 1208C (collectively 1208). In at least one embodiment, the indicators 1208 can provide an interactive point and/or indicator for each brewing container (or urn) position and what type of beverage needs to be brewed, blended, prepared, or dispensed into that position as well as which one of the beverage containers. For example there may be a beverage container 4, beverage container 7, beverage container 3. Other beverage containers, such as, but not limited to, 1, 2, 5, 6, that may be in other locations of a store, restaurant, franchise. Each of the beverage container(s) and/or positions can each have their own individual freshness timer that can be set as a count up or count down timer.

A countdown timer indicator 1205 can provide operations to indicate how many seconds, minutes or hours are left before the container's freshness has expired. For example, for teas, a freshness timer may provide for a range of timers that are equivalent to two to five hours for each beverage container. Other beverages may have other freshness timer values, ranging from one minute to one week. These freshness timers will allow beverages to be maintained in a safe and healthy condition and/or environment. If a freshness timer has expired a message window 1207 may pop up letting the operator or users of the beverage dispenser know the freshness time has expired and it is time to brew or prepare a new beverage to be dispensed in that container.

An operator may also click on or interact with the brewing display 1204 to initiate a freshness screen 1206 which may indicate and/or provide a list of when each of the containers for an individual store, restaurant, or location when that beverage was brewed as well as how much time until each beverage container's freshness timer will expire. If user and/or store operator, interacts with the beverage preparation screen 1204, to at least one of the beverage preparation detail screens 1209/1210. For example, an operator may select the number two position of the beverage dispenser to be used for brewing or dispensing, and instructions can be provided on the display as beverage preparation detail 1209, and indicate what type of tea, tea bag, or other beverage such as hot chocolate or coffee is to be placed into that brewing container.

In another example, there may be a problem for a sweetener, flavor or syrup that may be stored in a BIB or bag in a box indicating that that BIB or bag in a box is out or requires a refreshing to be able to brew the beverage as desired and properly instructed through the recipe, as illustrated in the beverage preparation detail screen 1210. An operator can also cancel the brewing operation at any time or can continue without performing any of the operations as illustrated in the beverage preparation detail screens 1209/1210. If a brewing operation has been initiated and all the operations steps and instructions have been completed the brewing display 1211 may be displayed. The brewing control screen 1211 can let the operator know which position 1213 and/or beverage container 1212 the beverage will be dispensed into. Beverage containers can also be an urn or another type of container that will allow for dispensing at a remote location from the beverage dispenser. Additionally, there may be a stop or cancel 1214 which shuts down the beverage dispenser if there are any safety hazards or other issues arising.

Figure 12B:
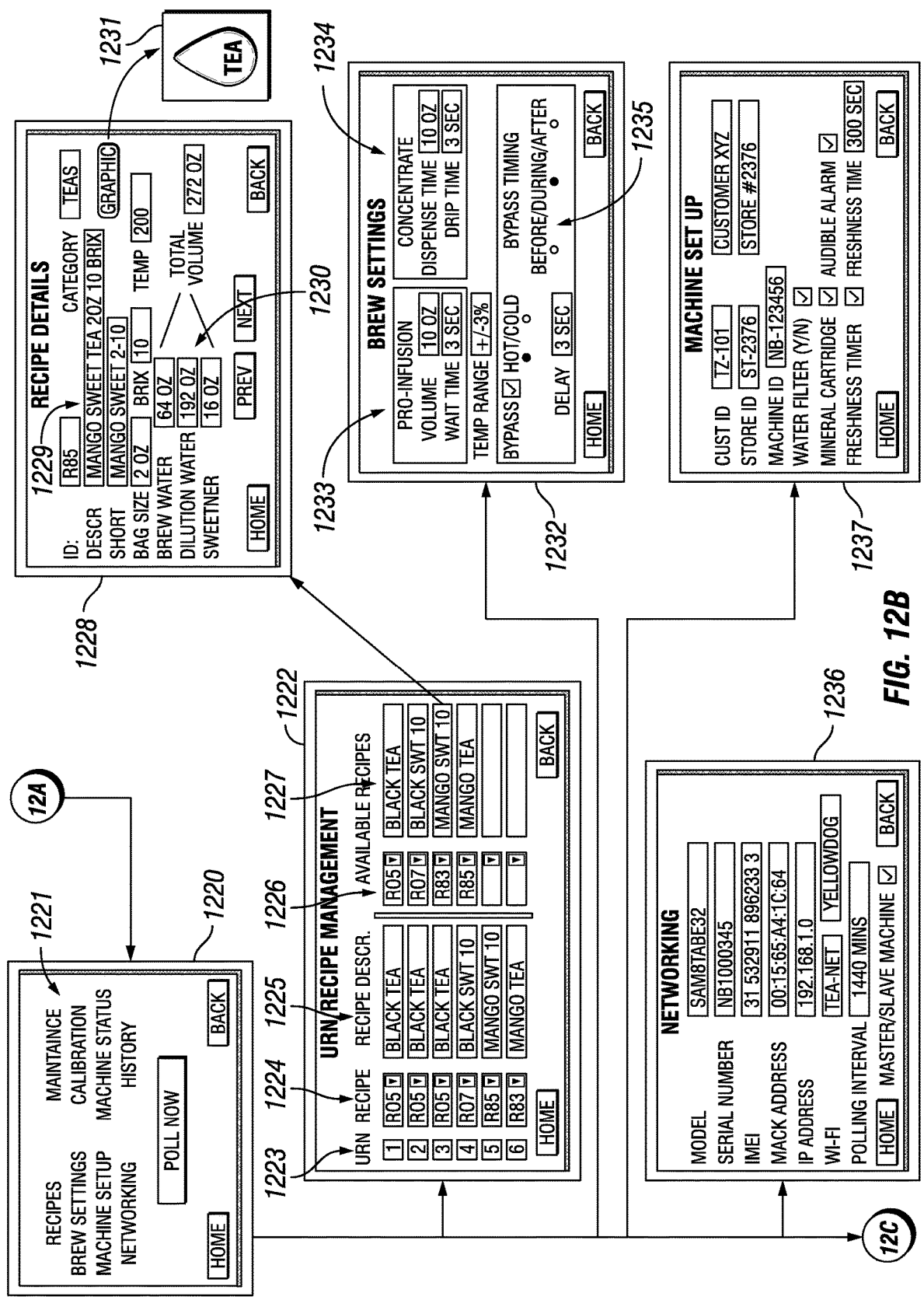
FIG. 12B is an illustration of menus showing a possible operational flow of a maintenance process for a beverage dispenser.

FIG. 12B is an illustration of menus shown as a possible operational flow of a maintenance process for a beverage dispenser in accordance with an embodiment of the present disclosure. If a maintenance user utilizes the log in screen as illustrated in FIG. 12A and provides the proper log in credentials and password the display may move to a maintenance display 1220. The maintenance screen 1220 will allow the user to select any one of the different maintenance or diagnostic operations. Some of the operations in maintenance list 1221 may include, but are not limited to, recipes, maintenance, brew settings, calibration, machine set up, machine status, networking, history; there may also be a polling or initiate a download operation as well as any number of operations. For example, there can be a poll now button that may force a machine or beverage dispenser to reach out to a server via one of the communication systems. These servers and/or databases, may include, but are not limited to, an advertising, maintenance, configuration, recipe database, and/or maintenance server.

Some examples of the maintenance that may be required include a recipe management screen 1222. The receipt management screen 1222 can allow for each individual beverage container or urn to be given its own unique number 1223, such as but not limited to, beverage container or urn 1, 2, 3, 4, 5, 6, 7, 8, 9, or other additional numbers. Each of these containers or urns can be assigned a recipe from the recipe list 1224. The recipe list 1224 may be a drop down selection, a multi-selectable list, a markable box, or any other selectable manner, method, or means. One example of this may be a drop down list that provides a limited number of recipes that can be selected from. In at least one embodiment, the recipes may be limited to specific stores and/or restaurant franchises as they may have unique recipes or flavoring that they would like desired, from a global recipe list.

A recipe description 1225, may provide details such as but not limited to, tea flavor, if a tea may be a sweet or unsweet tea, the amount of sweetener that is added to it, what type of flavoring or other individual information. For example, for a coffee the description may include what type of coffee, what type of roast and what type of sweeteners or flavorings that may be added to the recipe.

An available recipes line 1226/1227 may also be displayed in the recipe management display 1222. These available recipes may also be indicated in a description 1127 and/or recipe number 1226. For example, some locations may be limited to what recipes are available or how many beverage containers can be utilized for an individual recipe in order to prevent an operator from only serving sweet tea when unsweet tea is also desired. An operator may wish to limit the types and/or number of times a recipe can be prepared in a given day. Each of these recipes may also be detailed or managed and given individual details through a recipe details screen 1228. The recipe detail screen may include details such as, but not limited to, an ID, a description 1229 what type of beverage container or urn, the amount of each beverage element 1230, temperature, total fluid volume, category, and graphic 1231. For example, a beverage container or urn size may be indicated as there could be a small, large, extra-large or a one-time beverage container. Information such as the amount of tea, coffee, or brewing material that may be necessary if any, what type of sweetener, what type of flavorings that may need to be added, the temperature of the water, how much brewing water, how much water that needs to be mixed to dilute the recipe if necessary, indicated or controlled through the operations details or beverage elements 1230. Graphics 1231 can also be added to the interaction display so each type of beverage can also have colorful advertising display that will allow when they are brewing or being prepared to let customers, store, restaurant or location know as to what is forthcoming or has just been completed.

The brew elements 1230 may also be maintained or controlled through a brew settings page 1232. The brew settings page 1232 may provide for settings such as, but not limited to, infusion 1233, concentrate 1234, and bypass or delay 1235 selections. For example, the infusion 1233 details may include what type of fluid, water or sweetener, how much (weight) infusion water or sweetener may be required, and how long to wait before providing the infusion. The infusion also may include a dilution fluid, how much dilution fluid may be added, and how long it may take to add, or waiting to be added to a beverage. In another example, the concentrate 1234 details may include what type of fluid, concentration of the tea, sweeteners, syrups, or flavorings that also may be added, how long the wait before adding the concentrate, a drip and/or dispensing time, or steeping time. The bypass or delay section 1235 may include indicating a beverage is to be prepared as a hot brew or cold brew item, if the brewing, mixing, blending, and/or steeping process is to be bypassed, when a temperature change is to occur, and/or how long the process is to wait before beginning. Additionally, other interactions and/or operation of the brew settings 1232 may include dilution, infusion, concentration may occur.

Other details may include whether the brewing operation may be bypassed. For example a beverage such as sport mix or sport drink may be prepared in one of the beverage containers or urns. In that case it would be considered a post mix or flavoring operation in which no hot water or cold water is required as there may be a syrup or a mix that is already prepared and only needs to be performed for a mixing operation; therefore, the concentrate and infusion may be operated and/or the water temperature may be bypassed.

Networking and machine details and machine status can be provided through the screen 1236. These details can include what type of model, serial number, individual addresses as well as what type of network it is connected over such as wireless or wire and the name of the network and its password as well as may indicate how often the beverage dispenser or machine may activate control system or application or processes may search or attempt to connect to the server or database to maintain correct configurations and operations.

A machine set up screen 1237 may also allow for a customer or store details to be added. For example, a customer or store ID may be added and provided for a global or franchise list or ID. A machine ID, and/or serial number may also be included to identify the specific machine. In other examples, a water filter, and/or water filter alert can be indicated and/or selected by a user or operator. Additional selections can include, but are not limited to, a mineral cartridge, audible alarm, freshness timer, and/or a freshness time. The freshness timer value can be the maximum time that the timer will count up to or down from.

Figure 12C:
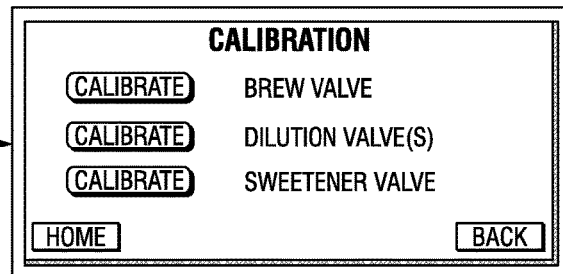
FIG. 12C is a continuing illustration of menus showing a possible operational flow of a maintenance process for a beverage dispenser.
Figure 12C:
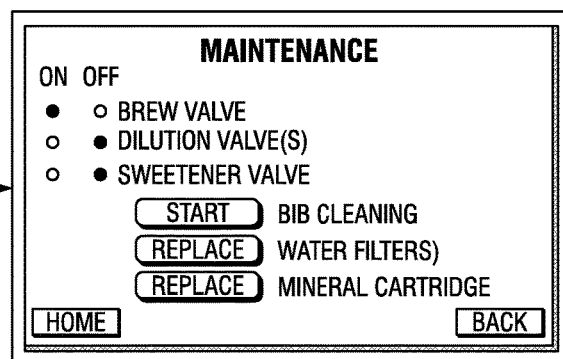
Figure 12C:
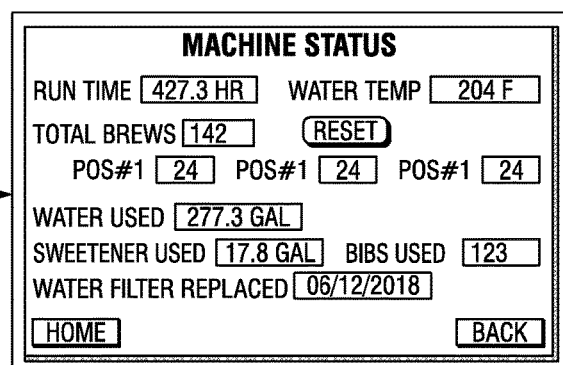
Figure 12C:
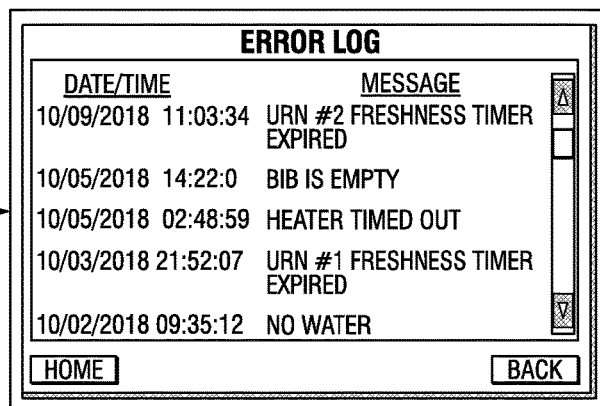

FIG. 12C is a continuing illustration of menus showing a possible operational flow of a maintenance process for a beverage dispenser in accordance with an embodiment of the present disclosure. A calibration screen 1240, can allow a user or operator to calibrate various function of the beverage dispenser. The calibrations may include, the brew value e.g., for how long a brew and/or steeping process will last, dilution values e.g., how long or how much dilution may occur, and a sweetener value, e.g., how long or how much sweetener may be added or included from a BIB, and/or the flow values or times for each fluid. A maintenance screen 1241 may allow for a user to activate or deactivate setting such as, but not limited to, brew value, dilution value(s), sweetener value(s), start a BIB or fluid distribution system cleaning, replace water filters, and/or mineral cartridges. A machine status screen 1242 may provide information such as, but not limited to, how long the beverage dispenser has been operational, the current and/or maximum water temperature, the number of brewing, blending and/or mixing operations that have occurred, with the ability to break the number of operations into categories for each brewing container, and/or position, the amount of water, and/or other fluids such as sweeteners, flavors, or other brewing materials that have been used, how many BIBs that have been used, and the filter status and/or change dates. An error log screen 1243 can allow for various errors or operations of the beverage dispenser to be logged and/or recorded for reporting. Some of the errors and/or operation that may be recorded include, but are not limited to, freshness timer expiration, brew operation, BIB status, water status, temperature or heating device status, and/or other operations or errors.

Figure 13:
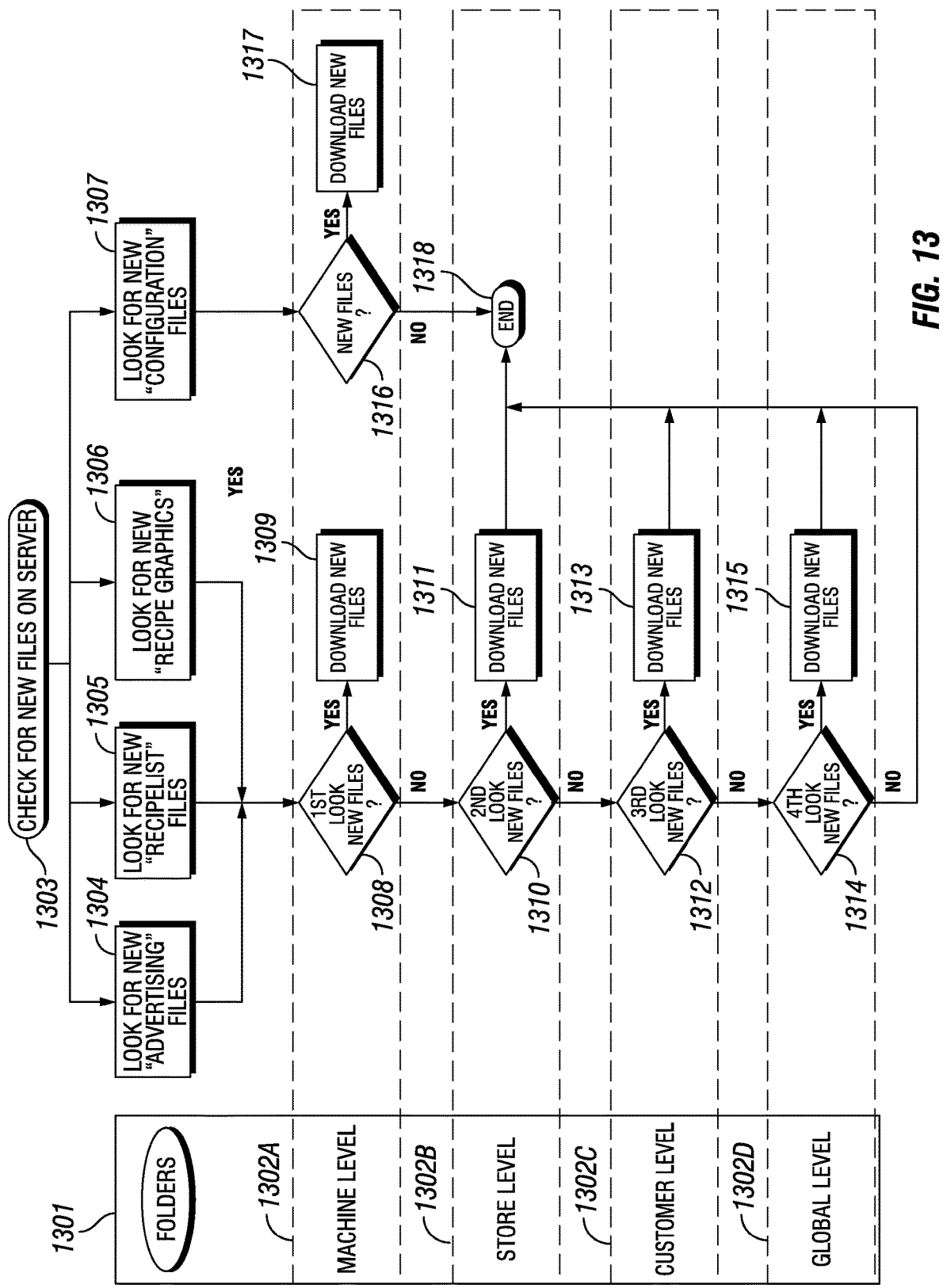
FIG. 13 is an illustration of a polling or file download operation.

FIG. 13 is an illustration of a polling or file download operation in accordance with an embodiment of the present disclosure. The confiscation files for a beverage dispenser may be separated into multiple files and/or folder 1301. The files or folders may include a machine level 1302A e.g., an individual beverage dispenser, a store level 1302B e.g., an individual store, restaurant, or franchisee, a customer level 1302C e.g., a brand or corporate franchisor, and/or a global level 1302D e.g., the operator and/or manufacturer of the beverage dispenser. The beverage dispenser(s) may poll a database and/or server through a computer network and/or the internet. In at least one embodiment, the database may be a cloud based server. The polling determines if updates are available on a server or database 1303. The updates may be, but are not limited to, various categories such as advertising files 1304, recipe list files 1305, recipe graphics 1306, and configuration files 1307.

Each of the categories may be polled, and/or downloaded consecutively or in parallel. However, each of the categories is polled and/or downloaded first at the machine level 1308. If there are any new files, they are downloaded 1309, and the next level is polled. For example, the second level polled is the store level 1310, and if there are any new files applicable for the store they are downloaded 1311, and the next level is polled. The third level may be the customer level 1312, and if there are any new files they are download 1313, and the next level is polled. When the fourth level is polled 1314, and any new files downloaded 1315 then the polling and/or downloading process can end 1318 or the next category may begin the polling and/or downloading process. It should be noted that if no new files are found for downloading the process continues to the next level. For example, if no new files are polled at the first level 1308, then the next level is polled 1310, and then next level 1312, and the fourth level 1314. An exception is made for the configuration file category, as there would only be files at the machine level. Accordingly, the machine level would be polled for any new files 1316, and if there are files to be downloaded they can be stored on the beverage dispenser or machine 1317, otherwise the polling and/or download process can end 1318 or continue to another category. These levels help ensure that stores can have consistent recipes and configurations of their beverage dispensers across multiple locations.

FIG. 14 is an illustration of a sample report that may be generated by beverage dispensing system, data management, logs and/or data analytics in accordance with an embodiment of the present disclosure. Such a report may include, but is not limited to, including customer, store, machine, recipe, and/or product information along with operations such as brewing, mixing, or blending operations, cases of material or elements consumed, the amount of water consumed, the amount of sweetener consumed, and/or the number of BIBs utilized by the beverage dispenser. These categories may be separated into levels such as, customers, stores, machines, recipes, products, elements, and/or user or operators. The reports, and/or logs may also include other information such as the number of water filter utilized, water temperature ranges, freshness timer ranges, freshness timer expirations, number of beverage containers utilized, number of positions utilized, etc.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A beverage dispensing apparatus comprising:
    an enclosure having a base section defining a volume capable of housing at least one bag in a box (BIB), a control section coupled to the base section and configured to house at least one heating device at least one fluid input, and a dispensing section having at least one fluid dispenser, and a computing device;
    a brewing container, wherein the brewing container is supported by a support structure along the bottom of the dispensing section, and having a mixing section and a brewing section that includes a brewing reservoir and a brewing filter; and
    at least one beverage container having a brewing container reservoir defined by the beverage container for receiving a beverage from the brewing container, a beverage container cover, and dispensing nozzle.

2. The beverage dispensing apparatus of claim 1, wherein the control section is removably coupled to the base section.

3. The beverage dispensing apparatus of claim 1, wherein the dispensing section is removably coupled to the control section.

4. The beverage dispensing apparatus of claim 1, wherein the base section further comprises a top section configured for receiving one or more of the beverage containers.

5. The beverage dispensing apparatus of claim 1, further comprising at least one pump connected to the BIB.

6. The beverage dispensing apparatus of claim 1, further comprising at least one heating device.

7. The beverage dispensing apparatus of claim 1, wherein the support structure further comprises at least one sensor.

8. A system for controlling a beverage dispensing device comprising:
    the beverage dispensing device further comprising an enclosure having a base section, a control section, and a dispensing section;
    a control circuit housed within the control section, and electrically coupled to at least one pump, at least one solenoid, and at least one heating device;
    a communication circuit coupled to the control circuit and at least one computing device; and
    wherein the at least one computing device configured to provide a control dataset to the control circuit.

9. The system for controlling a beverage dispensing device of claim 8, wherein the communication circuit can communicate with at least one database.

10. The system for controlling a beverage dispensing device of claim 8, wherein the communication circuit can receive a configuration dataset.

11. The system for controlling a beverage dispensing device of claim 8, wherein the communication circuit can send a report dataset.

12. The system for controlling a beverage dispensing device of claim 8, wherein the base section is sized to hold at least one bag in a box (BIB).

13. The system for controlling a beverage dispensing device of claim 8, wherein the at least one pump and the at least one heating device are housed in the control section.

14. A method for controlling a beverage dispensing device comprising:
  providing a control signal to a control circuit having at least one input and at least one output, the control signal being transmitted from a computing device via a communication circuit;
  pumping a mixing fluid to a first dispensing nozzle via a mixing pump electrically coupled to the control circuit;
  controlling a solenoid for a controlled fluid that can be provided to a heating device or the first dispensing nozzle;
  heating the controlled fluid with the heating device that electrically coupled to the control circuit;
  generating a heated fluid from a second dispensing nozzle;
  dispensing one or both of the heated fluid and mixing fluid to a brewing container, the mixing fluid dispensing to a mixing section of the brewing container, and the heated fluid to a brewing reservoir of the brewing container; and
  blending the mixing fluid and heating fluid together and providing the blend fluid as a beverage to a beverage container.

15. The method of claim 14, wherein the control signal is provided from a configuration dataset.

16. The method of claim 14, further comprises connecting the communication circuit with at least one database.

17. The method of claim 14 further comprising receiving a configuration dataset with the communication circuit.

18. The method of claim 14 further comprising sending a report dataset with the communication circuit.

19. The method of claim 14 further comprising timing with a first timer the time the beverage has been in the beverage container.

20. The method of claim 19 further comprising sending an alert to a user when the first timer expires or exceeds a defined threshold.

* * * * *